United States Patent
Cowburn et al.

(10) Patent No.: US 10,614,828 B1
(45) Date of Patent: *Apr. 7, 2020

(54) AUGMENTED REALITY SPEECH BALLOON SYSTEM

(71) Applicant: Snap Inc., Venice, CA (US)

(72) Inventors: Piers Cowburn, London (GB); Qi Pan, London (GB); Eitan Pilipski, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/014,193

(22) Filed: Jun. 21, 2018

Related U.S. Application Data

(63) Continuation of application No. 15/437,018, filed on Feb. 20, 2017, now Pat. No. 10,074,381.

(51) Int. Cl.
*G10L 21/00* (2013.01)
*G10L 21/10* (2013.01)
(Continued)

(52) U.S. Cl.
CPC .......... *G10L 21/10* (2013.01); *G06F 17/2705* (2013.01); *G06F 17/289* (2013.01);
(Continued)

(58) Field of Classification Search
CPC ....... G06T 19/006; G06T 11/60; G06T 11/00; G06T 13/40; G06T 13/80; G06T 19/00; G06T 2207/10021; G06T 2207/2207; G06T 2207/20081; G06T 2207/30184; G06T 2219/004; G06T 7/246; G06F 17/289; G06F 3/011; G06F 3/03; G06F 3/04815; G06F 17/241; G06F 17/2705; G06F 17/2785; G06F 17/30241; G06F 17/3043;
(Continued)

(56) References Cited

U.S. PATENT DOCUMENTS 4,581,634 A 4/1986 Williams
4,975,690 A 12/1990 Torres
(Continued)

FOREIGN PATENT DOCUMENTS

CA 2887596 A1 7/2015
EP 2051480 A1 4/2009
(Continued)

OTHER PUBLICATIONS

"U.S. Appl. No. 16/136,849, Corrected Notice of Allowability dated Apr. 25, 2019", 4 pgs.
(Continued)

*Primary Examiner* — Vijay B Chawan
(74) *Attorney, Agent, or Firm* — Schwegman Lundberg & Woessner, P.A.

(57) ABSTRACT

Disclosed is an augmented reality system to generate and cause display of an augmented reality interface at a client device. Various embodiments may detect speech, identify a source of the speech, transcribe the speech to a text string, generate a speech bubble based on properties of the speech and that includes a presentation of the text string, and cause display of the speech bubble at a location in the augmented reality interface based on the source of the speech.

20 Claims, 15 Drawing Sheets

(51) Int. Cl.
*G06F 17/28* (2006.01)
*G06F 17/27* (2006.01)
*G10L 15/25* (2013.01)
*G06K 9/00* (2006.01)
*G06T 11/60* (2006.01)
*G10L 25/63* (2013.01)
*G10L 15/26* (2006.01)

(52) U.S. Cl.
CPC .......... *G06K 9/00281* (2013.01); *G06T 11/60* (2013.01); *G10L 15/25* (2013.01); *G10L 15/265* (2013.01); *G10L 25/63* (2013.01)

(58) Field of Classification Search
CPC .......... G06F 17/3087; G06F 17/30876; G06F 2203/0381; G06F 3/04842; G06F 3/167; G06F 8/315; G10L 13/08; G10L 15/22; G10L 15/26; G10L 15/265; G10L 15/28; G10L 15/30; G10L 17/22
USPC ........ 704/2, 235, 258, 260, 270, 275, 270.1; 345/633; 381/118
See application file for complete search history.

(56) References Cited

U.S. PATENT DOCUMENTS

| | | | |
|---|---|---|---|
| 5,072,412 A | 12/1991 | Henderson, Jr. et al. | |
| 5,493,692 A | 2/1996 | Theimer et al. | |
| 5,699,444 A | 12/1997 | Palm | |
| 5,713,073 A | 1/1998 | Warsta | |
| 5,754,939 A | 5/1998 | Herz et al. | |
| 5,855,008 A | 12/1998 | Goldhaber et al. | |
| 5,883,639 A | 3/1999 | Walton et al. | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,205,432 B1 | 3/2001 | Gabbard et al. | |
| 6,285,381 B1 | 9/2001 | Sawano et al. | |
| 6,285,987 B1 | 9/2001 | Roth et al. | |
| 6,317,789 B1 | 11/2001 | Rakavy et al. | |
| 6,349,203 B1 | 2/2002 | Asaoka et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,658,095 B1 | 12/2003 | Yoakum et al. | |
| 6,668,173 B2 | 12/2003 | Greene | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,970,088 B2 | 11/2005 | Kovach | |
| 6,980,909 B2 | 12/2005 | Root et al. | |
| 7,020,494 B2 | 3/2006 | Spriestersbach et al. | |
| 7,085,571 B2 | 8/2006 | Kalhan et al. | |
| 7,110,744 B2 | 9/2006 | Freeny, Jr. | |
| 7,173,651 B1 | 2/2007 | Knowles | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,269,426 B2 | 9/2007 | Kokkonen et al. | |
| 7,315,823 B2 | 1/2008 | Brondrup | |
| 7,394,345 B1 | 7/2008 | Ehlinger et al. | |
| 7,411,493 B2 * | 8/2008 | Smith ................... H04W 4/02 | |
| | | | 340/539.11 |
| 7,423,580 B2 | 9/2008 | Markhovsky et al. | |
| 7,512,649 B2 | 3/2009 | Faybishenko et al. | |
| 7,535,890 B2 | 5/2009 | Rojas | |
| 7,607,096 B2 | 10/2009 | Oreizy et al. | |
| 7,639,943 B1 | 12/2009 | Kalajan | |
| 7,668,537 B2 | 2/2010 | DeVries | |
| 7,720,554 B2 | 5/2010 | Dibernardo et al. | |
| 7,737,965 B2 | 6/2010 | Alter et al. | |
| 7,770,137 B2 | 8/2010 | Forbes et al. | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 8,082,255 B1 | 12/2011 | Carlson, Jr. et al. | |
| 8,099,109 B2 | 1/2012 | Altman et al. | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,417 B1 | 4/2012 | Lee | |
| 8,183,997 B1 | 5/2012 | Wong et al. | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,285,199 B2 | 10/2012 | Hsu et al. | |
| 8,306,922 B1 | 11/2012 | Kunal et al. | |
| 8,326,327 B2 | 12/2012 | Hymel et al. | |
| 8,332,475 B2 | 12/2012 | Rosen et al. | |
| 8,352,546 B1 | 1/2013 | Dollard | |
| 8,385,950 B1 | 2/2013 | Wagner et al. | |
| 8,423,409 B2 | 4/2013 | Rao | |
| 8,472,935 B1 | 6/2013 | Fujisaki | |
| 8,502,903 B2 | 8/2013 | Kashitani | |
| 8,510,383 B2 | 8/2013 | Hurley et al. | |
| 8,525,825 B2 | 9/2013 | Zhu et al. | |
| 8,527,345 B2 | 9/2013 | Rothschild et al. | |
| 8,554,627 B2 | 10/2013 | Svendsen et al. | |
| 8,564,710 B2 | 10/2013 | Nonaka et al. | |
| 8,660,358 B1 | 2/2014 | Bergboer et al. | |
| 8,660,793 B2 | 2/2014 | Ngo et al. | |
| 8,676,623 B2 | 3/2014 | Gale et al. | |
| 8,682,350 B2 | 3/2014 | Altman et al. | |
| 8,712,776 B2 | 4/2014 | Bellegarda et al. | |
| 8,718,333 B2 | 5/2014 | Wolf et al. | |
| 8,724,622 B2 | 5/2014 | Rojas | |
| 8,761,800 B2 | 6/2014 | Kuwahara | |
| 8,788,680 B1 | 7/2014 | Naik | |
| 8,790,187 B2 | 7/2014 | Walker et al. | |
| 8,797,415 B2 | 8/2014 | Arnold | |
| 8,798,646 B1 | 8/2014 | Wang et al. | |
| 8,874,677 B2 | 10/2014 | Rosen et al. | |
| 8,909,679 B2 | 12/2014 | Root et al. | |
| 8,909,725 B1 | 12/2014 | Sehn | |
| 8,933,966 B2 | 1/2015 | Oi et al. | |
| 8,995,433 B2 | 3/2015 | Rojas | |
| 9,031,283 B2 | 5/2015 | Arth et al. | |
| 9,040,574 B2 | 5/2015 | Wang et al. | |
| 9,055,416 B2 | 6/2015 | Rosen et al. | |
| 9,058,687 B2 | 6/2015 | Kruglick | |
| 9,098,926 B2 | 8/2015 | Quan et al. | |
| 9,100,806 B2 | 8/2015 | Rosen et al. | |
| 9,100,807 B2 | 8/2015 | Rosen et al. | |
| 9,123,074 B2 | 9/2015 | Jacobs | |
| 9,129,432 B2 | 9/2015 | Quan et al. | |
| 9,143,681 B1 | 9/2015 | Ebsen et al. | |
| 9,152,477 B1 | 10/2015 | Campbell et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,240,074 B2 | 1/2016 | Berkovich et al. | |
| 9,258,459 B2 | 2/2016 | Hartley | |
| 9,317,133 B2 * | 4/2016 | Korah ................... G06T 19/006 |
| 9,317,921 B2 | 4/2016 | Chao et al. | |
| 9,355,123 B2 | 5/2016 | Wnuk et al. | |
| 9,361,283 B2 * | 6/2016 | Jones ................... G06F 17/241 |
| 9,385,983 B1 | 7/2016 | Sehn | |
| 9,396,354 B1 | 7/2016 | Murphy et al. | |
| 9,430,783 B1 | 8/2016 | Sehn | |
| 9,443,227 B2 | 9/2016 | Evans et al. | |

(56) References Cited

U.S. PATENT DOCUMENTS

| | | |
|---|---|---|
| 9,459,778 B2 | 10/2016 | Hogeg et al. |
| 9,465,816 B2 | 10/2016 | Johnson et al. |
| 9,489,661 B2 | 11/2016 | Evans et al. |
| 9,491,134 B2 | 11/2016 | Rosen et al. |
| 9,495,783 B1 * | 11/2016 | Samarasekera ......... G06T 11/60 |
| 9,537,811 B2 | 1/2017 | Allen et al. |
| 9,628,950 B1 | 4/2017 | Noeth et al. |
| 9,652,896 B1 | 5/2017 | Jurgenson et al. |
| 9,761,045 B1 | 9/2017 | Cote et al. |
| 9,805,020 B2 | 10/2017 | Gorman et al. |
| 9,836,890 B2 | 12/2017 | Jurgenson et al. |
| 9,984,499 B1 | 5/2018 | Jurgenson et al. |
| 10,074,381 B1 | 9/2018 | Cowburn et al. |
| 10,074,981 B2 * | 9/2018 | Faley ...................... H02J 3/14 |
| 10,102,680 B2 | 10/2018 | Jurgenson et al. |
| 10,366,543 B1 | 7/2019 | Jurgenson et al. |
| 2002/0087631 A1 | 7/2002 | Sharma |
| 2002/0097257 A1 | 7/2002 | Miller et al. |
| 2003/0001846 A1 | 1/2003 | Davis et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0050785 A1 | 3/2003 | Friedrich et al. |
| 2003/0148773 A1 | 8/2003 | Spriestersbach et al. |
| 2003/0229607 A1 | 12/2003 | Zellweger et al. |
| 2004/0078367 A1 | 4/2004 | Anderson et al. |
| 2004/0158739 A1 | 8/2004 | Wakai et al. |
| 2004/0189465 A1 | 9/2004 | Capobianco et al. |
| 2004/0215625 A1 | 10/2004 | Svendsen et al. |
| 2005/0022211 A1 | 1/2005 | Veselov et al. |
| 2005/0048989 A1 | 3/2005 | Jung |
| 2005/0104976 A1 | 5/2005 | Currans |
| 2005/0119936 A1 | 6/2005 | Buchanan et al. |
| 2005/0122405 A1 | 6/2005 | Voss et al. |
| 2005/0162523 A1 | 7/2005 | Darrell et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0287878 A1 | 12/2006 | Wadhwa et al. |
| 2007/0004426 A1 | 1/2007 | Pfleging et al. |
| 2007/0073517 A1 | 3/2007 | Panje |
| 2007/0075898 A1 | 4/2007 | Markhovsky et al. |
| 2007/0136228 A1 | 6/2007 | Petersen |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0233556 A1 | 10/2007 | Koningstein |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0032703 A1 | 2/2008 | Krumm et al. |
| 2008/0043041 A2 | 2/2008 | Hedenstroem et al. |
| 2008/0076505 A1 | 3/2008 | Nguyen et al. |
| 2008/0092233 A1 | 4/2008 | Tian et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0214210 A1 | 9/2008 | Rasanen et al. |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0318616 A1 | 12/2008 | Chipalkatti et al. |
| 2009/0006191 A1 | 1/2009 | Arankalle et al. |
| 2009/0015703 A1 | 1/2009 | Kim et al. |
| 2009/0030774 A1 | 1/2009 | Rothschild et al. |
| 2009/0030999 A1 | 1/2009 | Gatzke et al. |
| 2009/0058822 A1 | 3/2009 | Chaudhri |
| 2009/0079846 A1 | 3/2009 | Chou |
| 2009/0089710 A1 | 4/2009 | Wood et al. |
| 2009/0093261 A1 | 4/2009 | Ziskind et al. |
| 2009/0132341 A1 | 5/2009 | Klinger et al. |
| 2009/0132665 A1 | 5/2009 | Thomsen et al. |
| 2009/0157450 A1 | 6/2009 | Athsani et al. |
| 2009/0160970 A1 | 6/2009 | Fredlund et al. |
| 2009/0163182 A1 | 6/2009 | Gatti et al. |
| 2009/0192900 A1 | 7/2009 | Collison et al. |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0293012 A1 | 11/2009 | Alter et al. |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0113065 A1 | 5/2010 | Narayan et al. |
| 2010/0130233 A1 | 5/2010 | Lansing |
| 2010/0153144 A1 | 6/2010 | Miller et al. |
| 2010/0161658 A1 | 6/2010 | Hamynen et al. |
| 2010/0162149 A1 | 6/2010 | Sheleheda et al. |
| 2010/0185552 A1 | 7/2010 | Deluca et al. |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0250109 A1 | 9/2010 | Johnston et al. |
| 2010/0259386 A1 | 10/2010 | Holley et al. |
| 2010/0273509 A1 | 10/2010 | Sweeney et al. |
| 2011/0010205 A1 | 1/2011 | Richards |
| 2011/0029512 A1 | 2/2011 | Folgner et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0096093 A1 | 4/2011 | Oi et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0159890 A1 | 6/2011 | Fortescue et al. |
| 2011/0164163 A1 | 7/2011 | Bilbrey et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0270584 A1 | 11/2011 | Plocher et al. |
| 2011/0273575 A1 | 11/2011 | Lee |
| 2011/0282799 A1 | 11/2011 | Huston |
| 2012/0036015 A1 | 2/2012 | Sheikh |
| 2012/0041722 A1 | 2/2012 | Quan et al. |
| 2012/0059722 A1 | 3/2012 | Rao |
| 2012/0069233 A1 | 3/2012 | Nonaka et al. |
| 2012/0086727 A1 | 4/2012 | Korah et al. |
| 2012/0099800 A1 | 4/2012 | Llano et al. |
| 2012/0108293 A1 | 5/2012 | Law et al. |

(56) References Cited

U.S. PATENT DOCUMENTS

| | | |
|---|---|---|
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0122570 A1* | 5/2012 | Baronoff ............... A63F 13/655 463/31 |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0150978 A1 | 6/2012 | Monaco et al. |
| 2012/0165100 A1 | 6/2012 | Lalancette et al. |
| 2012/0169855 A1 | 7/2012 | Oh |
| 2012/0172062 A1 | 7/2012 | Altman et al. |
| 2012/0176401 A1 | 7/2012 | Hayward et al. |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0212632 A1 | 8/2012 | Mate et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0252418 A1 | 10/2012 | Kandekar et al. |
| 2012/0278387 A1 | 11/2012 | Garcia et al. |
| 2012/0304052 A1 | 11/2012 | Tanaka et al. |
| 2012/0307096 A1 | 12/2012 | Bray et al. |
| 2012/0307112 A1 | 12/2012 | Kunishige et al. |
| 2012/0314040 A1 | 12/2012 | Kopf et al. |
| 2013/0002649 A1 | 1/2013 | Wu et al. |
| 2013/0006759 A1 | 1/2013 | Srivastava et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0059607 A1 | 3/2013 | Herz et al. |
| 2013/0086072 A1 | 4/2013 | Peng et al. |
| 2013/0095857 A1 | 4/2013 | Garcia et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0159110 A1 | 6/2013 | Rajaram et al. |
| 2013/0169680 A1 | 7/2013 | Chien et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0191198 A1 | 7/2013 | Carlson et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0232194 A1 | 9/2013 | Knapp et al. |
| 2013/0265450 A1 | 10/2013 | Barnes, Jr. |
| 2013/0267253 A1 | 10/2013 | Case et al. |
| 2013/0308822 A1 | 11/2013 | Marimon et al. |
| 2013/0311255 A1 | 11/2013 | Cummins et al. |
| 2013/0325964 A1 | 12/2013 | Berberat |
| 2014/0006129 A1 | 1/2014 | Heath |
| 2014/0019264 A1 | 1/2014 | Wachman et al. |
| 2014/0045530 A1 | 2/2014 | Gordon et al. |
| 2014/0047016 A1 | 2/2014 | Rao |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0064624 A1 | 3/2014 | Kim et al. |
| 2014/0081634 A1* | 3/2014 | Forutanpour ......... G06F 17/289 704/235 |
| 2014/0086727 A1* | 3/2014 | Xu ........................ F01D 5/082 415/116 |
| 2014/0096029 A1 | 4/2014 | Schultz |
| 2014/0114565 A1 | 4/2014 | Aziz et al. |
| 2014/0125668 A1 | 5/2014 | Steed et al. |
| 2014/0129207 A1* | 5/2014 | Bailey .................. G06F 17/289 704/2 |
| 2014/0155102 A1 | 6/2014 | Cooper et al. |
| 2014/0173424 A1 | 6/2014 | Hogeg et al. |
| 2014/0214471 A1 | 7/2014 | Schreiner, III |
| 2014/0258405 A1 | 9/2014 | Perkin |
| 2014/0266703 A1 | 9/2014 | Dalley, Jr. et al. |
| 2014/0277735 A1* | 9/2014 | Breazeal ............... B25J 11/0005 700/259 |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno et al. |
| 2014/0324627 A1 | 10/2014 | Haver et al. |
| 2014/0324629 A1 | 10/2014 | Jacobs |
| 2015/0040074 A1* | 2/2015 | Hofmann ............... G06T 19/006 715/852 |
| 2015/0087263 A1 | 3/2015 | Branscomb et al. |
| 2015/0088622 A1 | 3/2015 | Ganschow |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0222814 A1 | 8/2015 | Li et al. |
| 2015/0261917 A1 | 9/2015 | Smith |
| 2015/0350136 A1 | 12/2015 | Flynn, III et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0277419 A1 | 9/2016 | Allen et al. |
| 2017/0006094 A1 | 1/2017 | Abou Mahmoud et al. |
| 2017/0124713 A1 | 5/2017 | Jurgenson et al. |
| 2017/0243371 A1 | 8/2017 | Jurgenson et al. |
| 2018/0005450 A1 | 1/2018 | Daniels et al. |
| 2018/0089904 A1 | 3/2018 | Jurgenson et al. |
| 2019/0295326 A1 | 9/2019 | Jurgenson et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014115136 A1 | 7/2014 |
| WO | WO-2014194262 A2 | 12/2014 |
| WO | WO-2016065131 A1 | 4/2016 |
| WO | WO-2017075476 A1 | 5/2017 |

OTHER PUBLICATIONS

"U.S. Appl. No. 16/136,849, Response filed Jan. 17, 2019 to Non Final Office Action dated Oct. 17, 2018", 9 pgs.

"U.S. Appl. No. 16/136,849, Notice of Allowance dated Mar. 5, 2019", 7 pgs.

U.S. Appl. No. 14/954,090, U.S. Pat. No. 9,652,896, filed Nov. 30, 2015, Image Based Tracking in Augmented Reality Systems.

U.S. Appl. No. 15/591,887, U.S. Pat. No. 9,836,890, filed May 10, 2017, Image Based Tracking in Augmented Reality Systems.

U.S. Appl. No. 15/830,965, U.S. Pat. No. 10,102,680, filed Dec. 4, 2017, Image Based Tracking in Augmented Reality Systems.

U.S. Appl. No. 16/136,849, filed Sep. 20, 2018, Image Based Tracking in Augmented Reality Systems.

(56) References Cited

OTHER PUBLICATIONS

U.S. Appl. No. 15/437,018, U.S. Pat. No. 10,074,381, filed Feb. 20, 2017, Augmented Reality Speech Balloon System.
"A Whole New Story", Snap, Inc., URL: https://www.snap.com/en-US/news/, (2017), 13 pgs.
"Adding a watermark to your photos", eBay, URL: http://pages.ebay.com/help/sell/pictures.html, (accessed May 24, 2017), 4 pgs.
"U.S. Appl. No. 14/053,913, Response filed Nov. 13, 2017 to Non Final Office Action dated Jun. 12, 2017", 11 pgs.
"U.S. Appl. No. 14/953,913, Non Final Office Action dated Jun. 12, 2017", 35 pgs.
"U.S. Appl. No. 14/953,913, Notice of Allowance dated Jan. 30, 2018", 23 pgs.
"U.S. Appl. No. 14/954,090, Corrected Notice of Allowance dated Feb. 3, 2017", 4 pgs.
"U.S. Appl. No. 14/954,090, Corrected Notice of Allowance dated Apr. 18, 2017", 4 pgs.
"U.S. Appl. No. 14/954,090, Notice of Allowance dated Jan. 11, 2017", 11 pgs.
"U.S. Appl. No. 14/954,090, Preliminary Amendment filed Dec. 28, 2016", 10 pgs.
"U.S. Appl. No. 15/437,018, Corrected Notice of Allowability dated Jul. 11, 2018", 2 pgs.
"U.S. Appl. No. 15/437,018, Corrected Notice of Allowance dated Jun. 6, 2018", 5 pgs.
"U.S. Appl. No. 15/437,018, Examiner Interview Summary dated Feb. 16, 2018", 3 pgs.
"U.S. Appl. No. 15/437,018, Non Final Office Action dated Jan. 26, 2018", 9 pgs.
"U.S. Appl. No. 15/437,018, Notice of Allowance dated May 18, 2018", 7 pgs.
"U.S. Appl. No. 15/437,018, Response Filed Mar. 21, 2018 to Non Final Office Action dated Jan. 26, 2018", 9 pgs.
"U.S. Appl. No. 15/591,887, Corrected Notice of Allowance dated Sep. 8, 2017", 4 pgs.
"U.S. Appl. No. 15/591,887, Notice of Allowance dated Aug. 25, 2017", 10 pgs.
"U.S. Appl. No. 15/591,887, Preliminary Amendment filed Jun. 12, 2017", 10 pgs.
"U.S. Appl. No. 15/591,887, PTO Response to Rule 312 Communication dated Sep. 19, 2017", 2 pgs.
"U.S. Appl. No. 15/830,965, Corrected Notice of Allowability dated Aug. 6, 2018", 4 pgs.
"U.S. Appl. No. 15/830,965, Non Final Office Action dated Feb. 16, 2018", 7 pgs.
"U.S. Appl. No. 15/830,965, Notice of Allowability dated Jul. 5, 2018", 5 pgs.
"U.S. Appl. No. 15/830,965, Notice of Allowance dated Jun. 13, 2018", 8 pgs.
"U.S. Appl. No. 15/830,965, Response filed May 16, 2018 to Non Final Office Action dated Feb. 16, 2018", 10 pgs.
"U.S. Appl. No. 15/971,566, Non Final Office Action dated Jun. 14, 2018", 7 pgs.
"BlogStomp", StompSoftware, URL: http://stompsoftware.com/blogstomp, (accessed May 24, 2017), 12 pgs.
"Cup Magic Starbucks Holiday Red Cups come to life with AR app", Blast Radius, URL: http://www.blastradius.com/work/cup-magic, (2016), 7 pgs.
"Daily App: InstaPlace (iOS/Android): Give Pictures a Sense of Place", TechPP, URL: http://techpp.com/2013/02/15/instaplace-app-review, (2013), 13 pgs.
"InstaPlace Photo App Tell the Whole Story", URL: https://youtu.be/uF_gFkg1hBM, (Nov. 8, 2013), 113 pgs.
"International Application Serial No. PCT/US2015/037251, International Search Report dated Sep. 29, 2015", 2 pgs.
"International Application Serial No. PCT/US2016/059503, International Preliminary Report on Patentability dated May 11, 2018", 7 pgs.
"International Application Serial No. PCT/US2016/059503, International Search Report dated Jan. 23, 2017", 4 pgs.
"International Application Serial No. PCT/US2016/059503, Written Opinion dated Jan. 23, 2017", 5 pgs.
"Introducing Snapchat Stories", URL: https://www.youtube.com/watch?v=88Cu3yN-LIM, (Oct. 3, 2013), 92 pgs.
"Macy's Believe-o-Magic", URL: https://www.youtube.com/watch?v=xvzRXy3J0Z0, (Nov. 7, 2011), 102 pgs.
"Macys Introduces Augmented Reality Experience in Stores across Country as Part of Its 2011 Believe Campaign", Business Wire, URL: https://www.businesswire.com/news/home/20111102006759/en/Macys-Introduces-Augmented-Reality-Experience-Stores-Country, (Nov. 2, 2011), 6 pgs.
"Starbucks Cup Magic", URL: https://www.youtube.com/watch?v=RWwQXi9RG0w, (Nov. 8, 2011), 87 pgs.
"Starbucks Cup Magic for Valentine's Day", URL: https://www.youtube.com/watch?v=8nvqOzjq10w, (Feb. 6, 2012), 88 pgs.
"Starbucks Holiday Red Cups Come to Life, Signaling the Return of the Merriest Season", Business Wire, URL: http://www.businesswire.com/news/home/20111115005744/en/2479513/Starbucks-Holiday-Red-Cups-Life-Signaling-Return, (Nov. 15, 2011), 5 pgs.
Carthy, Roi, "Dear All Photo Apps: Mobli Just Won Filters", URL: https://techcrunch.com/2011/09/08/mobli-filters, (Sep. 8, 2011), 10 pgs.
Janthong, Isaranu, "Instaplace ready on Android Google Play store", Android App Review Thailand, URL: http://www.android-free-app-review.com/2013/01/instaplace-android-google-play-store.html, (Jan. 23, 2013), 9 pgs.
Leyden, John, "This SMS will self-destruct in 40 seconds", URL: http://www.theregister.co.uk/2005/12/12/stealthtext/, (Dec. 12, 2005), 1 pg.
Macleod, Duncan, "Macys Believe-o-Magic App", URL: http://theinspirationroom.com/daily/2011/macys-believe-o-magic-app, (Nov. 14, 2011), 10 pgs.
Macleod, Duncan, "Starbucks Cup Magic Lets Merry", URL: http://theinspirationroom.com/daily/2011/starbucks-cup-magic, (Nov. 12, 2011), 8 pgs.
Notopoulos, Katie, "A Guide to the New Snapchat Filters and Big Fonts", URL: https://www.buzzfeed.com/katienotopoulos/a-guide-to-the-new-snapchat-filters-and-big-fonts?utm_term=.bkQ9qVZWe#.nv58YXpkV, (Dec. 22, 2013), 13 pgs.
Panzarino, Matthew, "Snapchat Adds Filters, A Replay Function and for Whatever Reason, Time, Temperature and Speed Overlays", URL: https://techcrunch.com/2013/12/20/snapchat-adds-filters-new-font-and-for-some-reason-time-temperature-and-speed-overlays/, (Dec. 20, 2013), 12 pgs.
Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.
"U.S. Appl. No. 16/135,849, Preliminary Amendment filed Oct. 15, 2018", 10 pgs.
"U.S. Appl. No. 16/136,849, Non Final Office Action dated Oct. 17, 2018", 4 pgs.
"U.S. Appl. No. 16/438,226, Non Final Office Action dated Jul. 10, 2019", 6 pgs.
"U.S. Appl. No. 16/438,226, Response filed Oct. 8, 2019 to Non-Final Office Action dated Jul. 10, 2019", 11 pgs.

* cited by examiner

700

CAUSING DISPLAY OF A PRESENTATION OF A SPACE AT A CLIENT DEVICE, THE PRESENTATION OF THE SPACE INCLUDING A FIRST PERSON
702

DETECTING SPEECH THAT INCLUDES SPEECH PROPERTIES
704

IDENTIFYING THE FIRST PERSON AS A SOURCE OF THE SPEECH
706

TRANSCRIBING THE SPEECH TO A TEXT STRING BASED ON THE SPEECH PROPERTIES
708

GENERATING A SPEECH BUBBLE BASED ON THE SPEECH PROPERTIES, THE SPEECH BUBBLE INCLUDING THE TEXT STRING
710

CAUSING DISPLAY OF THE SPEECH BUBBLE AT A POSITION ADJACENT TO THE FIRST PERSON WITHIN THE PRESENTATION OF THE SPACE
712

*FIG. 7*

AUGMENTED REALITY SPEECH BALLOON SYSTEM

PRIORITY

This application is a continuation of and claims the benefit of priority of U.S. patent application Ser. No. 15/437,018, filed on Feb. 20, 2017, which is hereby incorporated by reference herein in its entirety.

TECHNICAL FIELD

Embodiments of the present disclosure relate generally to mobile computing technology and, more particularly, but not by way of limitation, to the presentation of augmented and virtual reality displays.

BACKGROUND

Augmented reality (AR) is a live direct or indirect view of a physical, real-world environment whose elements are supplemented, or "augmented," by a computer-generated sensory input such as sound, video, graphics, or the like. As a result, the technology functions to enhance a user's perception of reality.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 is a flowchart illustrating various operations of the augmented reality system in generating and causing display of a speech bubble in a graphical user interface (GUI), according to certain example embodiments.

DETAILED DESCRIPTION

Figure 1:
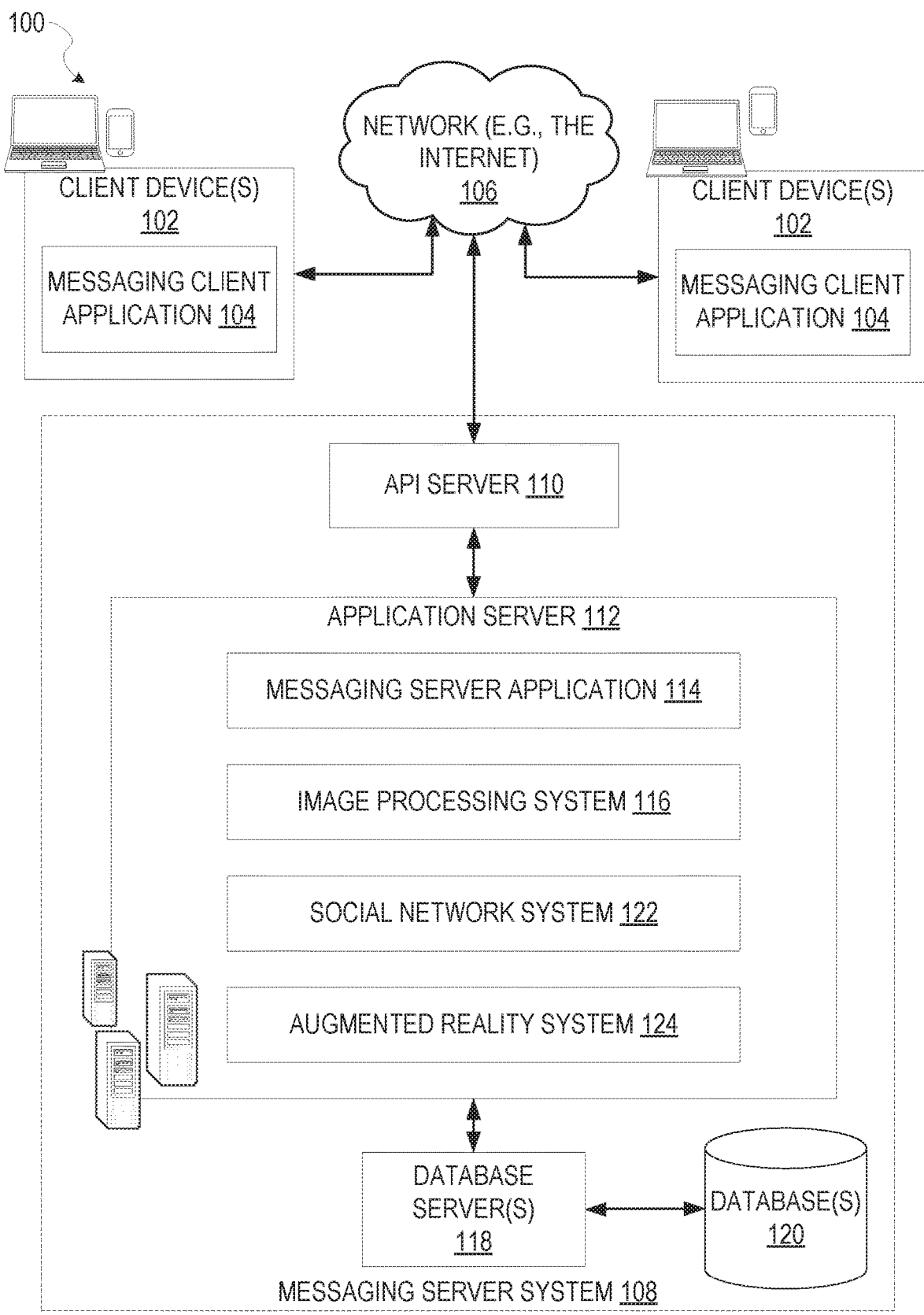
FIG. 1 is a block diagram showing an example messaging system for exchanging data (e.g., messages and associated content) over a network in accordance with some embodiments, wherein the messaging system includes an augmented reality system.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed is an augmented reality system to generate and cause display of an augmented reality interface at a client device. Various embodiments may detect speech, identify a source of the speech, transcribe the speech to a text string, generate a speech bubble based on properties of the speech and that includes a presentation of the text string, and cause display of the speech bubble at a location in the augmented reality interface based on the source of the speech.

Some embodiment augmented reality systems may include a video and image capture system to perform operations that include recording and acquiring images of a space, a graphical interface configured to display a presentation of the space, and a microphone to receive sound. In some example embodiments, the augmented reality system receives sounds and detects speech. For example, the augmented reality system may differentiate general ambient noises and sounds from speech based on techniques known to those skilled in the art, such as Voice Activity Detection (VAD).

In some example embodiments, the augmented reality system identifies a source of the speech in response to detecting the speech. For example, the source of the speech may include a person (e.g., a person in the space depicted in the presentation of the space), as well as a radio, television, telephone and/or mobile device, or other similar device that includes speakers and which may be configured to output a sound signal. For example, to identify a source of the speech, the augmented reality system may apply speech detection or facial landmark recognition techniques and other similar techniques to detect a person's lips moving. Based on the person's lips moving, the augmented reality system may determine that the person (specifically the person's mouth) is the source of the speech.

In instances where the source of the speech is a radio, television, telephone and/or mobile device, the augmented reality system may apply acoustic source localization techniques. Acoustic source localization include techniques for locating a source of a source given measurements of a sound field. The sound field can be described using physical quantities like sound pressure and particle velocity. By measuring these properties it is (indirectly) possible to obtain a source direction.

For example, the presentation of the space may include depictions of multiple people, each with corresponding user profiles. Having received the speech data (e.g., the speech recorded through the microphone), the augmented reality system identifies a user profile based on the speech data through speech recognition techniques. Upon determining the user profile based on the speech data, the augmented reality system determines which individual depicted in the presentation is the source of the speech based on facial landmark recognition data.

In some example embodiments, the augmented reality system transcribes the speech into a text string based on natural language speech recognition techniques. In further embodiments, the augmented reality system may translate the transcribed text string into one or more languages based on user preferences.

Having identified a source of the speech, the augmented reality system generates and causes display of a speech bubble. The size and position of the speech bubble may be based on the speech data, the text string, and the location of the source of the speech. For example, the transcribed speech data may have a length based on a total number of characters in the text string. The size of the speech bubble may thereby be based on the total number of characters in the text string. The position of the speech bubble in the GUI may be based on the location of the source of the speech. The augmented reality system may place the speech bubble adjacent to the source of the speech. In some example embodiments, the augmented reality system may identify significant and/or essential elements in the presentation (e.g., a person or persons), and place the speech bubble at a position so as not to obstruct the essential and significant elements.

In some embodiments, the augmented reality system may determine an emotional effect of the detected speech based on techniques that include, but are not limited to: analysis of attributes of the speech itself (e.g., volume and cadence of the speech); and a translation of the text string of the transcribed speech; as well as facial landmark recognition techniques (e.g., based on facial landmarks of a user). The emotional effect may include anger, sadness, happiness, love, and the like. In some embodiments, the presentation of the speech bubble and the text string generated by the augmented reality system may be based on the emotional effect.

For example, in some example embodiments, the augmented reality system may parse the text string of the transcribed speech into individual words, determine a definition of the set of words, and compare the definitions of the words to an emotional effect library. Based on the comparison, the augmented reality system may determine an intended emotional effect of the speech. For example, the text string may include a set of words that are typically associated with happiness, either literally, or based on context.

In further embodiments, the augmented reality system may determine the emotional effect of the detected speech based on the speech data, and attributes of the speech itself. For example, the speech data may indicate a volume, as well as a cadence of the speech. The augmented reality system may therefore determine the emotional effect based on the speech attributes, such as the volume and cadence.

In further embodiments, the augmented reality system may determine the emotional effect of the detected speech based on facial landmark recognition techniques. For example, having identifies a user as the source of the speech, the augmented reality system may capture facial landmarks of the user and apply facial landmark recognition techniques to determine an emotional state of the user (e.g., based on a smile, a frown, a furrowed brow, etc.). Thus, based on the emotional state, the augmented reality system determines the emotional effect of the speech.

In some example embodiments, the augmented reality system may detect non-verbal sounds and identify an appropriate onomatopoeia based on the non-verbal sounds. Onomatopoeia refers to words that phonetically imitate or suggest a non-verbal sound. Words like "bang," "woof," and "pop" are examples of onomatopoeia that refer to non-verbal sounds. Upon detecting a non-verbal sound, the augmented reality system may access an onomatopoeia library to select an appropriate onomatopoeia, and generates and causes display of a graphical element at a location in the GUI based on the source of the onomatopoeia.

Consider an illustrative example from a user perspective. A client device, executing an application of the augmented reality system, may display a presentation of a space (e.g., a basketball court, an office, a restroom, etc.), wherein the space includes one or more individuals (wherein each individual has a corresponding user profile). The augmented reality system may detect speech (e.g., through a microphone of the client device), and identify a source of the speech in the presentation of the space based on the techniques discussed above. For example, the augmented reality system may detect that facial landmarks of a first individual among the one or more individuals depicted in the presentation indicate that the first individual's mouth and lips were moving. Based on the facial landmarks, the augmented reality system may determine that the first individual is a source of the speech.

Having determined the source of the speech, the augmented reality system may transcribe the speech to a text string. In some example embodiments, the augmented reality system may also translate the speech to a different language based on preferences. For example, a user associated with the client device itself may specify language preferences indicating a first language, while the detected speech was in a second language. Based on the language preferences of the user associated with the client device, the augmented reality system may translate the detected speech from the second language to the first language.

The augmented reality system determines an emotional effect of the speech based on the techniques discussed above. For example, the augmented reality system may determine that based on the facial landmarks of the first individual, and definitions of the text string, the emotional effect of the speech is anger. The augmented reality system generates and causes display of a speech bubble based on a location of the first individual (the source of the speech) and the determined emotional effect. For example, the speech bubble and corresponding text may be stylized to indicate the emotional effect.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an augmented reality system 124. The augmented reality system 124 may be or include any instrumentality or aggregate of instrumentalities operable to compute, process, store, display, generate, communicate, or apply various forms of data for user profile building, audience derivation, control, or other purposes.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database(s) 120. Examples of functions and services supported by the social network system 122 include the identification of other users of the messaging system 100 with which a particular user has relationships or is "following," and also the identification of other entities and interests of a particular user.

The augmented reality system 124 provides functionality to generate and cause display of augmented reality elements in a GUI, including speech bubbles, as well as graphical elements representative of onomatopoeia.

The application server 112 is communicatively coupled to one or more database server(s) 118, which facilitates access to a database(s) 120 in which is stored data associated with messages processed by the messaging server application 114.

Figure 2:
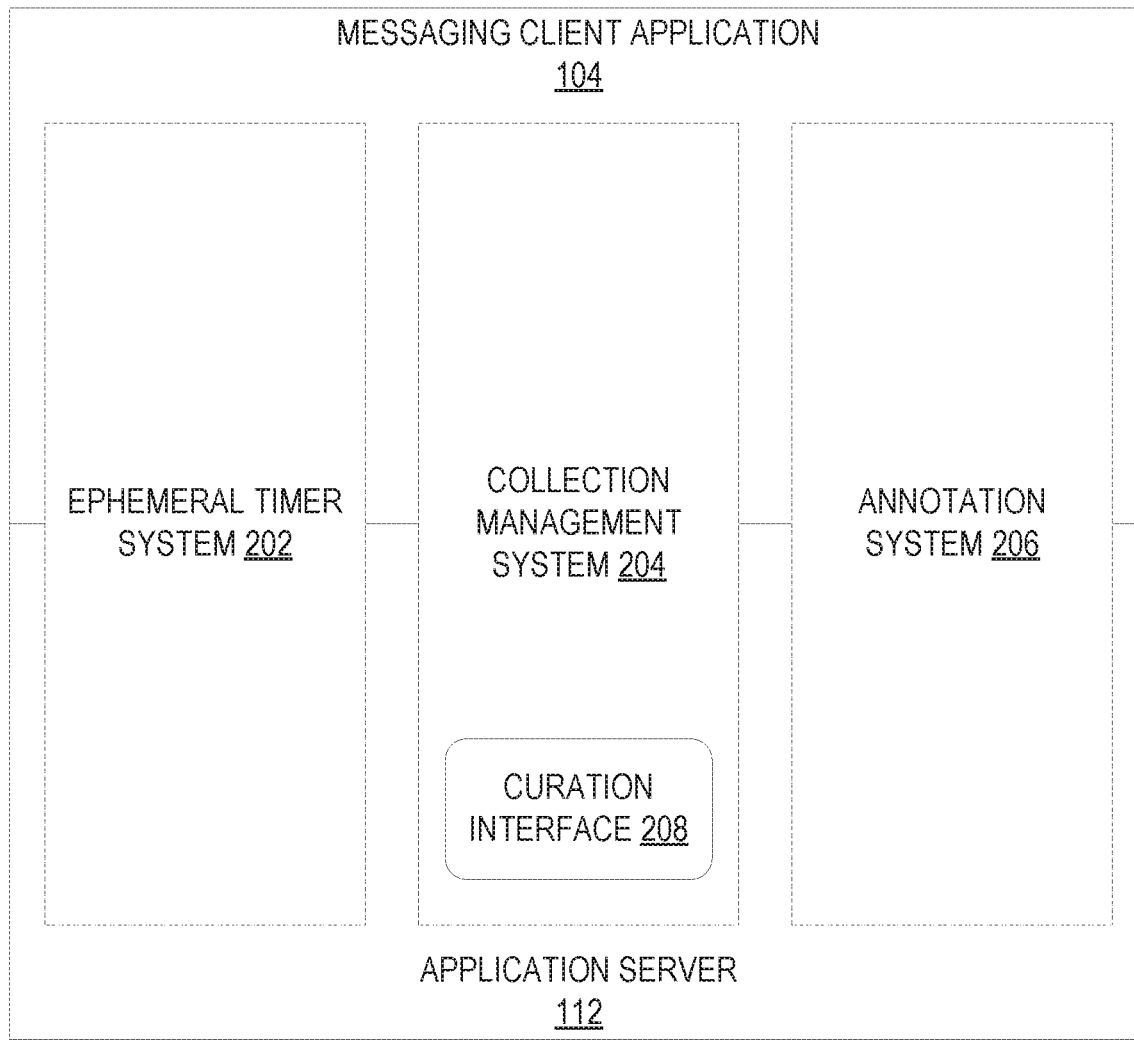
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
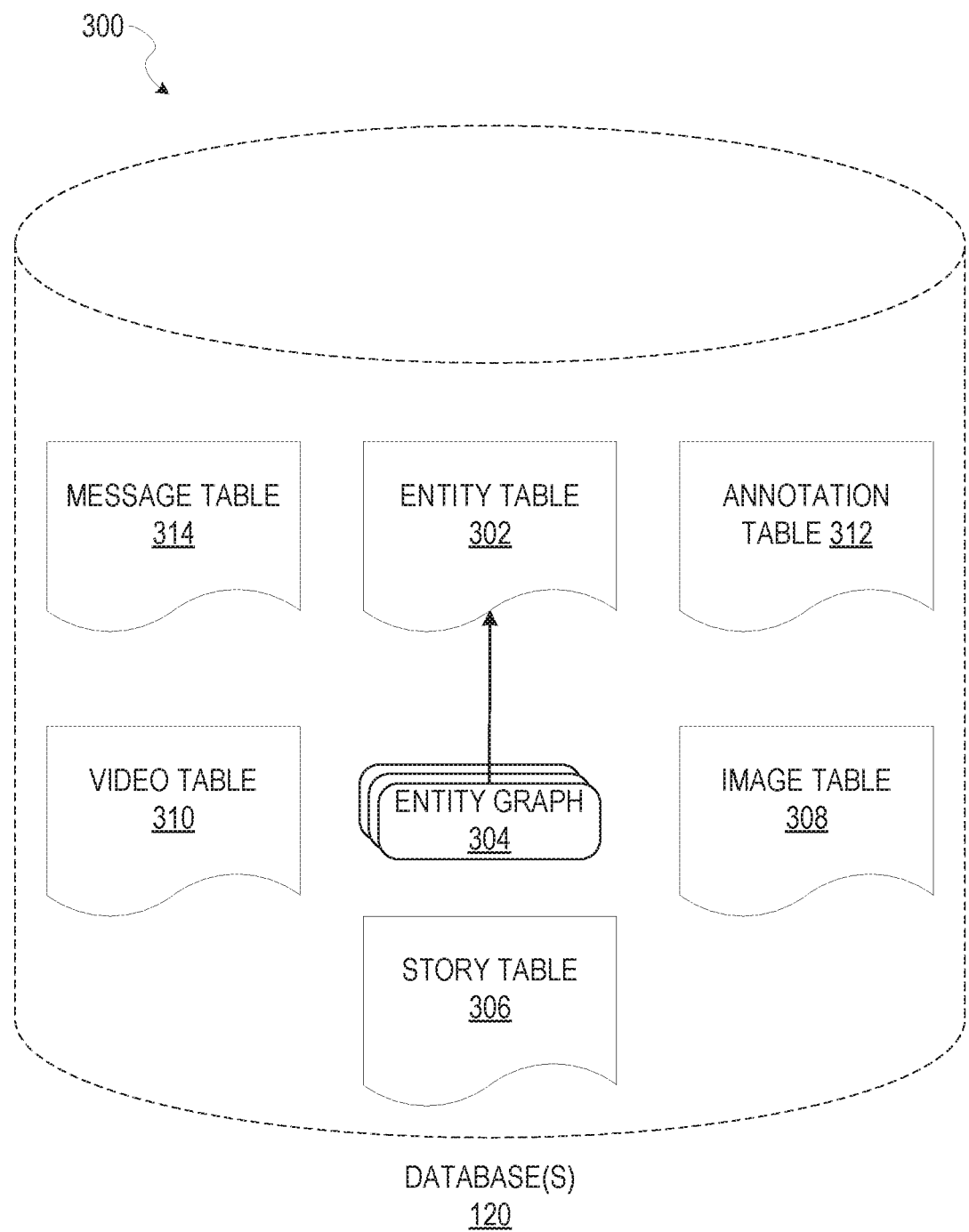
FIG. 3 is a schematic diagram illustrating data which may be stored in the database of the messaging server system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data which may be stored in the database(s) 120 of the messaging server system 108, according to certain example embodiments. While the content of the database(s) 120 is shown to comprise a number of tables, it will be appreciated that the data could be stored in other types of data structures (e.g., as an object-oriented database).

The database(s) 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database(s) 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filers include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
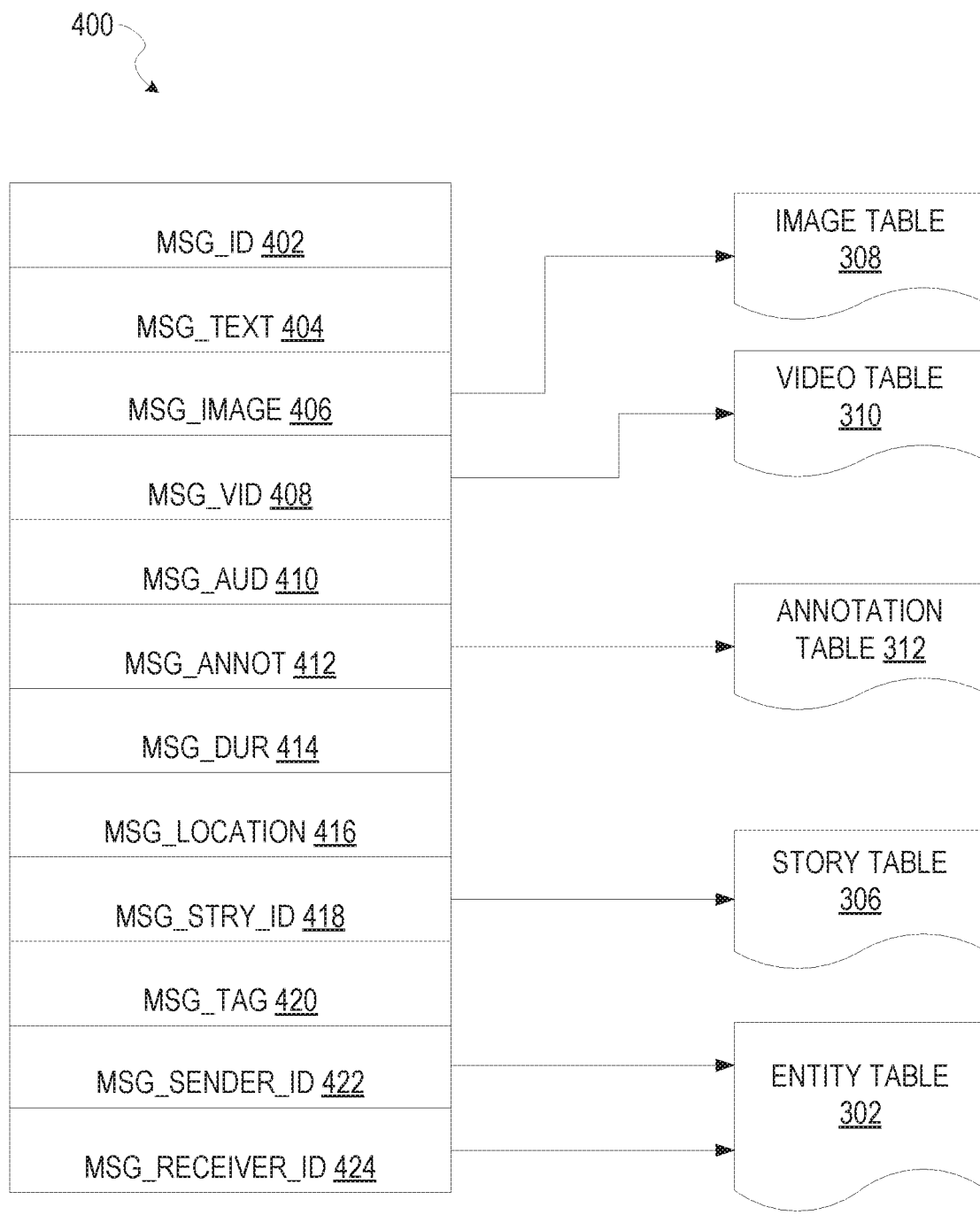
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database(s) 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address or device identifier) indicative of a user of the client device 102 on which the message 400 was generated and from which the message 400 was sent A message receiver identifier 424: an identifier (e.g., a messaging system identifier, email address or device identifier) indicative of a user of the client device 102 to which the message 400 is addressed.

The contents (e.g. values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
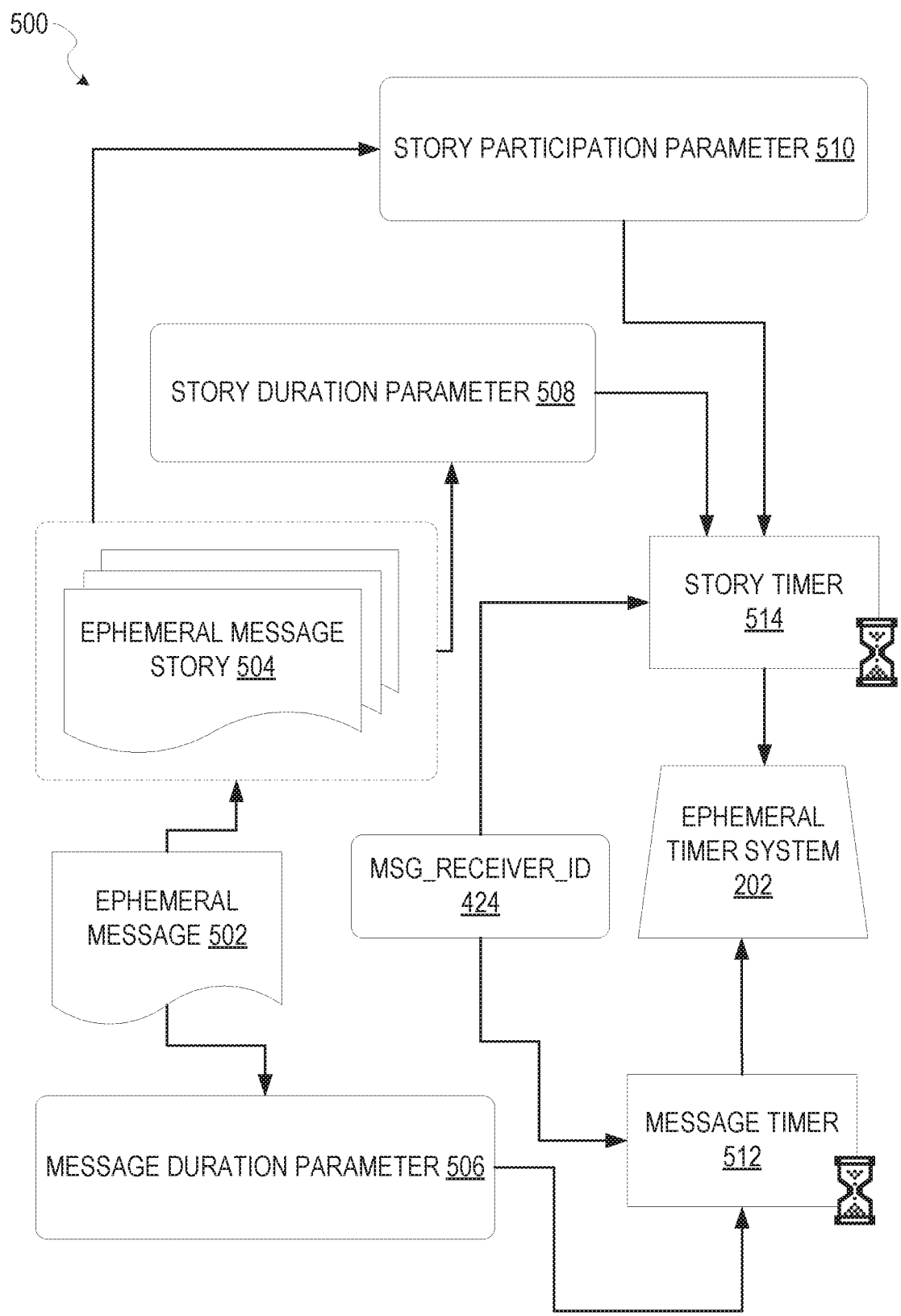
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral) in accordance with some embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is a SNAPCHAT application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal SNAPCHAT story, or an event story). The ephemeral message story 504 has an associated story duration parameter 508, a value of which determines a time-duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message story 504 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines, firstly, whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time-period specified by the story duration parameter 508. In a further embodiment, a certain ephemeral message 502 may expire, within the context of ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510. The ephemeral message story may include a speech bubble displayed within a presentation of a space.

Responsive to the ephemeral timer system 202 determining that an ephemeral message story 504 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502. In some embodiments, the speech bubble may only be displayed for a period of time defined by the ephemeral timer system 202. For example, upon expiration of the time period, the speech bubble may vanish from a presentation of a space, and in further embodiments, may be replaced by a different speech bubble altogether.

Figure 6:
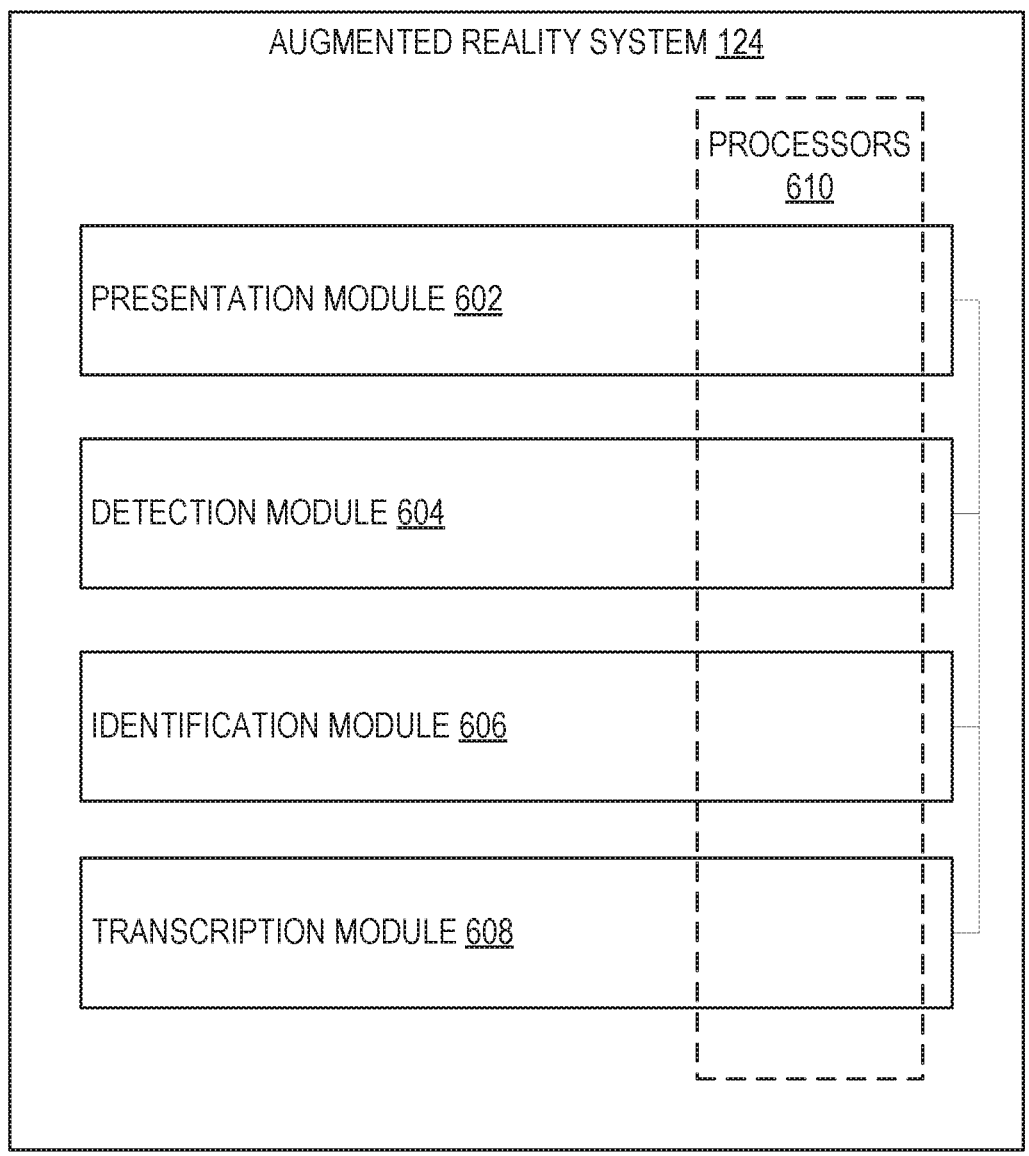
FIG. 6 is a block diagram illustrating various modules of an augmented reality system, according to certain example embodiments.

FIG. 6 is a block diagram 600 illustrating one possible implementation of components of the augmented reality system 124. In various embodiments, such components configure the augmented reality system 124 to cause display of a presentation of a space, detect speech, identify a source of the speech, determine the location of a depiction of the source of the speech in the presentation of the space, transcribe the speech to a text string, generate a speech bubble based on the text string, and cause display of the speech bubble at a position in the presentation of the space. The augmented reality system 124 is shown as including a presentation module 602, a detection module 604, an identification module 606, and a transcription module 608, all, or some, configured to communicate with each other (e.g., via a bus, shared memory, or a switch). Any one or more of these modules may be implemented using one or more processors 610 (e.g., by configuring such one or more processors to perform functions described for that module) and hence may include one or more of the processors 610.

Any one or more of the modules described may be implemented using hardware alone (e.g., one or more of the processors 610 of a machine) or a combination of hardware and software. For example, any module described of the augmented reality system 124 may physically include an arrangement of one or more of the processors 610 (e.g., a subset of or among the one or more processors of the machine) configured to perform the operations described herein for that module. As another example, any module of the engagement tracking system 610 may include software, hardware, or both, that configure an arrangement of one or more processors 610 (e.g., among the one or more processors of the machine) to perform the operations described herein for that module. Accordingly, different modules of the engagement tracking system 610 may include and configure different arrangements of such processors 610 or a single arrangement of such processors 610 at different points in time. Moreover, any two or more modules of the augmented reality system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 7 is a flowchart illustrating various operations of the augmented reality system 124 in performing a method 700 for generating and causing display of a speech bubble in a graphical user interface, according to certain example embodiments. Operations of the method 700 may be performed by the modules described above with respect to FIG. 6. As shown in FIG. 7, the method 700 includes one or more operations 702, 704, 706, 708, 710 and 712. In some example embodiments, the method 700 may be performed by the augmented reality system 124 in real-time during a video chat between client devices. For example, as users of the client devices speak to one another, the method 700 may be performed to generate and cause display of speech bubbles within the corresponding displays of the client devices.

Operation 702 may be performed by the presentation module 602. At operation 702, the presentation module 602 generates and causes display of a presentation of a space at a client device (e.g., client device 102). For example, the client device 102 may have an integrated camera, and may capture and display an image of a space. The presentation of the space may include a depiction of a first person.

Operation 704 may be performed by the detection module 604. At operation 704, the detection module 604 detects sounds (e.g., via a microphone component of a mobile computing device) that include speech. The speech may include speech properties such as a volume, a cadence, a tone, as well as a length of the speech. For example, the detection module 604 may capture ambient sound, and detect speech in the ambient sound based on various speech detection techniques as discussed above. The detection module 604 may then extract the speech properties from the audio data that contains the speech.

Operation 706 may be performed by the identification module 606. At operation 706, the identification module 606 identifies the first person as a source of the speech. For example, the identification module 606 may detect movement of one or more facial landmarks of the first person based on the image of the space. The identification module 606 may determine that the facial landmarks of the first person indicate that their mouth was moving (i.e., indicating that they were speaking). Based on the facial landmarks of the first person indicating that a mouth of the first person was moving at the time that the speech was detected, the identification module 606 may determine that the first person was the source of the speech. In response to determining that the first person was the source of the speech, the identification module 606 determines a location of the first person in the image in order to appropriately place the speech bubble.

In further embodiments, the identification module 606 may employ speech recognition techniques to identify the first person as the source of the speech. For example, the first person may have an associated user profile that includes speech data, such that the first person may be identified based on the speech data. Upon detecting the speech, the identification module 606 may determine that based on the speech data and the speech, that the source of the speech is the first person. Upon determining that the source of the speech is the first person, the identification module 606 may determine that the image includes a depiction of the first person based on the facial landmark recognition data and the image data.

In instances where the source of the speech is a radio, television, telephone and/or mobile device, the identification module 606 may apply acoustic source localization techniques. Acoustic source localization include techniques for locating a source of a source given measurements of a sound field. For acoustic localization this means that if the source direction is measured at two or more locations in space, it is possible to triangulate its location. For example, the identification module 606 may record the speech as segments of audio data, wherein each segment of the audio data is recorded at a slightly different position, due to inherent movement of the recording device (e.g., a user holding a mobile phone will inadvertently move the mobile phone even slightly during recording). The identification module 606 determines a location of the speech based on triangulation of the segments of audio data. The identification module 606 therefore determines the source of the speech based on the location.

The sound field can be described using physical quantities like sound pressure and particle velocity. By measuring these properties it is (indirectly) possible to obtain a source direction.

Operation 708 may be performed by the transcription module 608. At operation 708, the transcription module 608 transcribes the speech to a text string. The transcription module 608 may reside within a client device 102, performing the transcription of the speech to text at the client device 102 itself, while in other example embodiments, the transcription module 608 may reside within a server system, remote from the client device 102, and delivering the transcribed speech to the client device 102.

In response to the detection module 604 detecting the speech, the transcription module 608 may record the speech to a database (e.g., database 120). In some example embodiments, the transcription module 608 may not record the speech to the database 120 at all, and may instead transcribe the speech to a text string in real time based on speech recognition technology known to persons of skill in the art.

In some example embodiments, the transcription module 608 determines appropriate punctuation to apply to the text string based on the speech properties, including the cadence of the speech. For example, based on the inflection of the speech, the transcription module 608 may select a comma, a question mark, period, exclamation point, ellipsis, or the like.

In some example embodiments, the transcription module 608 may translate the speech from a first language to a second language, based on a user language preference, or based on a user input specifying a translation request. For example, a user of the client device 102 may have an associated user profile that includes a language preference specifying a language (e.g., the second language). Upon detecting the speech, the detection module 604 determines that the speech is in a first language. The transcription module 608 may transcribe the speech into a text string, and translate the text string from the first language to the second language.

In further example embodiments, a user of the client device 102 may provide a user input specifying a translation request to translate the speech from the first language to a language specified by the user. For example, a user of the client device 102 may provide a user input requesting that the speech be translated from a first language to a second language specified by the user. In some embodiments, the transcription module 608 may automatically detect the language of the speech, while in other embodiments the user may specify the language of the speech as well as the language to translate the speech.

Operation 710 may be performed by the presentation module 602. At operation 710, the presentation module 602 generates a speech bubble that includes a presentation of the text string, based on the speech properties, a location of the source of the speech in the presentation, and the text string. The speech bubble may for example include a main body portion to include a presentation of the text string, and a tail portion to indicate a source of the speech. In instances where more than one sources of a speech have been identified, the presentation module 602 may generate a speech bubble that includes multiple tail portions, wherein each tail portion is directed at a source of the speech. In further embodiments, the shape of the speech bubble may be based on an emotional effect of the speech, wherein the emotional effect may be determined based on the speech properties.

The size of the speech bubble may be based on the length of the text string. For example, the presentation module 602 may generate the speech bubble such that the text string is entirely enclosed and encompassed by the speech bubble. In some example embodiments, the presentation module 602 may present only a portion of the text string at a given time by only displaying single sentences of the text string at a time, or by breaking the text string into portions based on natural pauses and breaks in the speech.

Operation 712 may be performed by the presentation module 602. At operations 712, the presentation module 602 causes display of the speech bubble at a position in the presentation of the space, based on the location of the source of the speech. In some example embodiments, the presentation module 602 identifies the position to display the speech bubble based on the location of the source of the speech, as well as locations of significant elements in the presentation. For example, the presentation module 602 may identify a position in the presentation of the space that does not include any significant elements (e.g., faces). The presentation module 602 may thereby display the speech bubble at the position without obstructing any significant elements in the presentation.

Figure 8:
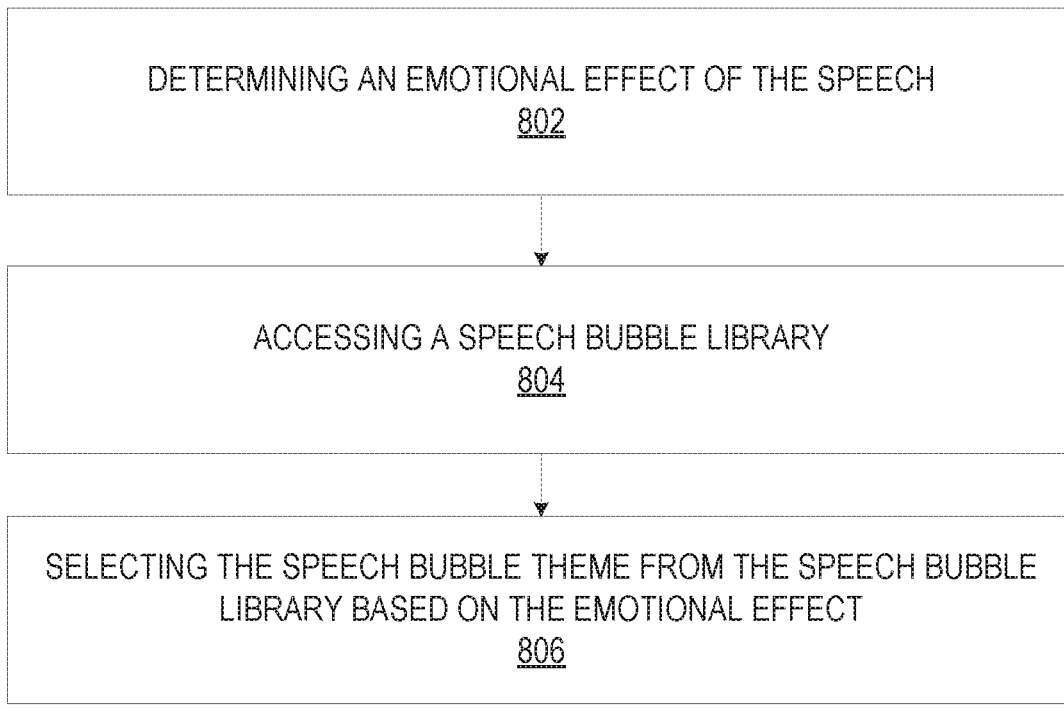
FIG. 8 is a diagram illustrating various operations of the augmented reality system in generating the speech bubble based on an emotional effect, according to certain example embodiments.

FIG. 8 is a diagram illustrating various operations of the augmented reality system 150 in performing a method 800 for generating the speech bubble based on an emotional effect, according to certain example embodiments. Operations of the method 800 may be performed by the modules described above with respect to FIG. 6. As shown in FIG. 8, the method 800 includes one or more operations 802, 804, and 806 that may be performed as part (e.g., a precursor task, a subroutine, or a portion) of the method 700, according to some example embodiments.

Operation 802 may be performed by the detection module 604. At operation 802, the detection module 802 determines an emotional effect of the speech based on one or more of the speech properties, facial recognition, and the speech itself. For example, to determine the emotional effect of the speech, the detection module 604 may apply facial landmark recognition techniques to analyze facial landmarks of a person identified as the source of the speech. In further embodiments, the detection module 604 determines the emotional effect of the speech based on the speech properties including the volume and cadence of the speech. For example, a high volume may indicate excitement or anger, while a low volume may indicate shyness.

In further embodiments, the detection module 604 may determine the emotional effect of the speech based on definitions of keywords in the context of the speech. For example, the detection module 604 may access the transcribed text string of the speech and determine definitions for each word of the text string. The detection module 604 may thereby compare the definitions of the speech to an emotional effect library, wherein the emotional effect library includes a set of emotions and corresponding words and definitions. The detection module 604 may thereby select an appropriate emotional effect based on the words and/or definitions.

Operation 804 may be performed by the presentation module 602. At operation 804, the presentation module 602 accesses a speech bubble library that includes a set of speech bubble themes. The speech bubble themes indicate a design and form to be applied to the speech bubble based on the emotional effect. For example, an emotional effect of "angry" may have a corresponding speech bubble theme that causes the speech bubble to display as a red jagged bubble, with red text and animated fire, while an emotional effect of "sad" may have a corresponding speech bubble theme that causes the speech bubble to display as a drooping blue bubble with frowny faces and black text. The speech bubble themes may also have corresponding graphical elements and icon to be displayed with the speech bubbles in the presentation of the space (e.g., hearts, smiley faces, frowny faces, etc.).

Operation 806 may be performed by the presentation module 602. At operation 806, the presentation module 602 selects a speech bubble theme based on the emotional effect.

Figure 9:
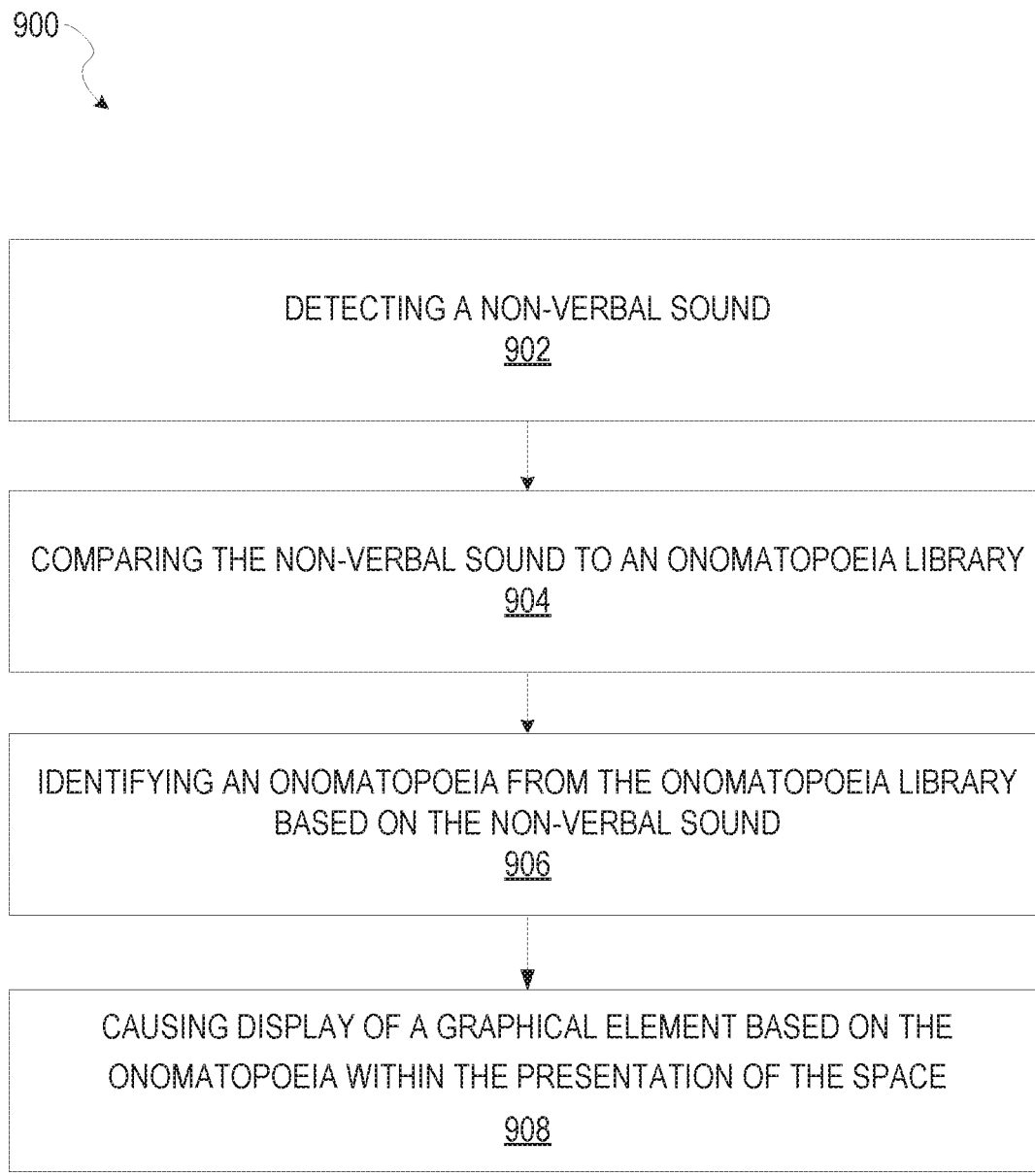
FIG. 9 is a flowchart illustrating various operations of the augmented reality system in causing display of a graphical element based on an onomatopoeia, according to certain example embodiments.

FIG. 9 is a flowchart illustrating various operations of the augmented reality system 150 in performing a method 900 for causing display of a graphical element based on an onomatopoeia, according to certain example embodiments. Operations of the method 900 may be performed by the modules described above with respect to FIG. 6. As shown in FIG. 9, the method 900 includes one or more operations 902, 904, 906, and 908 that may be performed as part (e.g., a precursor task, a subroutine, or a portion) of the method 700, according to some example embodiments.

Operation 902 may be performed by the detection module 604. At operation 902, the detection module 604 detects a non-verbal sound. Non-verbal sounds may include noises described by onomatopoeic words, such as "boom," "pop," "snkit," "meow," "moo," "woof woof." and the like.

Operation 904 may be performed by the detection module 604. At operation 604, the detection module 604 compares the non-verbal sound to an onomatopoeia library that includes a list of onomatopoeic words. For example, the detection module 604 may record a wave form representative of the non-verbal sound and compare the wave form to a list of onomatopoeic words with corresponding wave forms in the onomatopoeia library.

Operation 906 may be performed by the detection module 604. At operation 906, the detection module 604 identifies an appropriate onomatopoeia from the onomatopoeia library based on the non-verbal sounds (e.g., the wave form representative of the non-verbal sound). In some example embodiments, the onomatopoeia library may include a list of graphical elements representative of their corresponding onomatopoetic word (e.g., an explosion for "boom").

Operation 908 may be performed by the presentation module 602. At operation 908, the presentation module 602 causes display of the graphical element and the onomatopoetic word at a position in the presentation of the space. In some example embodiments, the detection module 604 may identify a location of the non-verbal sound. The presentation module 602 may cause display of the onomatopoetic word at a position based on the location of the non-verbal sound.

Figure 10:
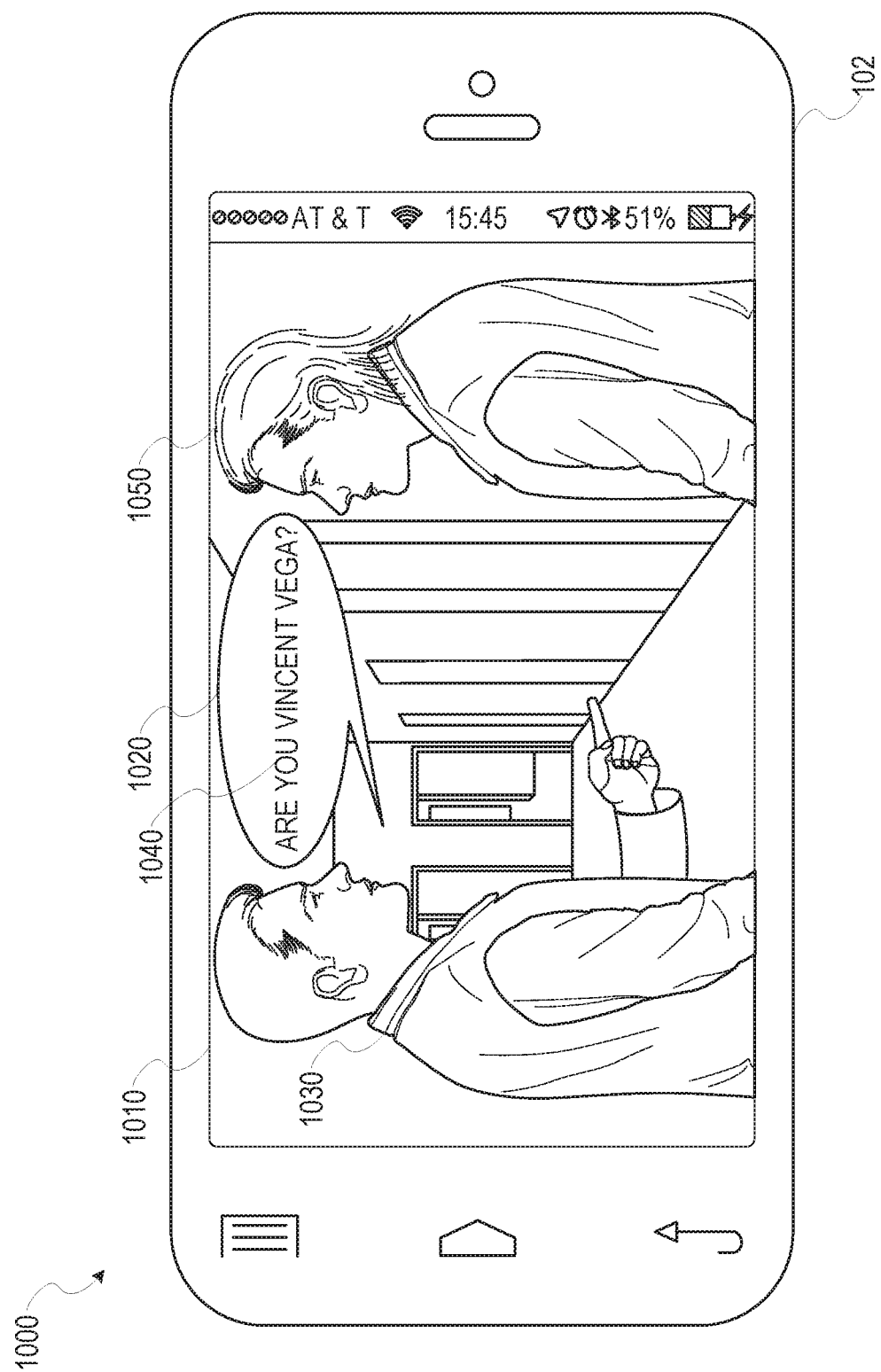
FIG. 10 is an example of an augmented reality speech bubble, according to certain example embodiments.

FIG. 10 is an example of an augmented reality interface 1000 configured to display a presentation 1010 of a space and a speech bubble 1020 generated by the augmented reality system 150, according to certain example embodiments. As shown, FIG. 10 includes the presentation 1010, speech bubble 1020, a first individual 1030, a text string 1040, and a second individual 1050.

As shown in FIG. 10, the presentation 1010 may include a depiction of the first individual 1030 and the second individual 1050, who may be engaged in a conversation. As discussed above, with respect to operations 704 and 706 of FIG. 7, the augmented reality system 150 detects and identifies a source of speech based on factors that may include facial landmarks of a user (e.g., the first user 1030), and/or speech and facial landmark recognition technology. As shown in FIG. 10, the augmented reality system 150 identified the first individual 1030 as the source of a speech.

As discussed in operation 708 of FIG. 7, the augmented reality system 150 transcribes the detected speech to a text string 1040, based on properties of the speech that include volume, cadence, tone, and a length of the speech. For example, the text string 1040 may be displayed in different fonts based on the speech properties for emphasis and/or to indicate an emotional effect of the speech. In some example embodiments, the first individual 1030 may have an associated user profile that includes display preferences that alter a presentation of the speech bubble 1020 and the text string 1040. The user profile may indicate that text strings associated with the user must be displayed in a specific font (e.g., Times New Roman, Wingdings, Algeria), specific color (e.g., blue, gold), specific language (e.g., English, Armenian. Chinese), etc. For example, in response to identifying the first individual 1030 as a source of the detected speech, the augmented reality system 150 may extract facial landmarks of the first individual 1030 to identify a corresponding user profile of the first individual 1030 based on speech and/or facial landmark recognition technology. The augmented reality system 150 may display the text string based on the user profile information and/or the speech properties.

The speech bubble 1020 is generated based on the speech properties and the presentation 1010. As discussed in operation 710 of FIG. 7, and the method 800 of FIG. 8, the augmented reality system 150 may generate and cause display of the speech bubble 1020 based on the speech properties of the detected speech, as well as the presentation 1010. For example, the presentation 1010 includes a depiction of the first individual 1030 and the second individual 1050 at positions in the presentation 1010. The augmented reality system 150 may identify an appropriate location in the presentation 1010 to display the speech bubble 1020 so that the speech bubble 1020 does not block or otherwise cover elements in the presentation 1010, including for example, the first individual 1030 and the second individual 1050. A size of the speech bubble 1020 may be based on available/unoccupied space in the presentation 1010, as well as based on speech properties.

Consider an illustrative explanation of FIG. 10, wherein a user of a client device 102 displays the presentation 1010 of the space. As shown in FIG. 10, the presentation 1010 includes a depiction of the first individual 1030 and the second individual 1050. As the first individual 1030 speaks, the augmented reality system 150 detects the speech and identifies the first individual 1030 as a source of the speech based on factors discussed above, including an indication that the first individual 1030 is speaking based on facial landmarks of the first individual 1030 (e.g., facial landmarks indicate that lips are moving). Upon identifying the first individual 1030 as the source of the detected speech, the augmented reality system 150 transcribes the speech to the text string 1040, and generates a speech bubble 1020 based on at least speech properties of the speech. In some example embodiments, the speech bubble 1020 may additionally be based on a length of the text string. The augmented reality system 150 displays the speech bubble 1020 at a position in the presentation 1010 based on the source of the speech and the available/unoccupied space, in real-time.

Figure 11:
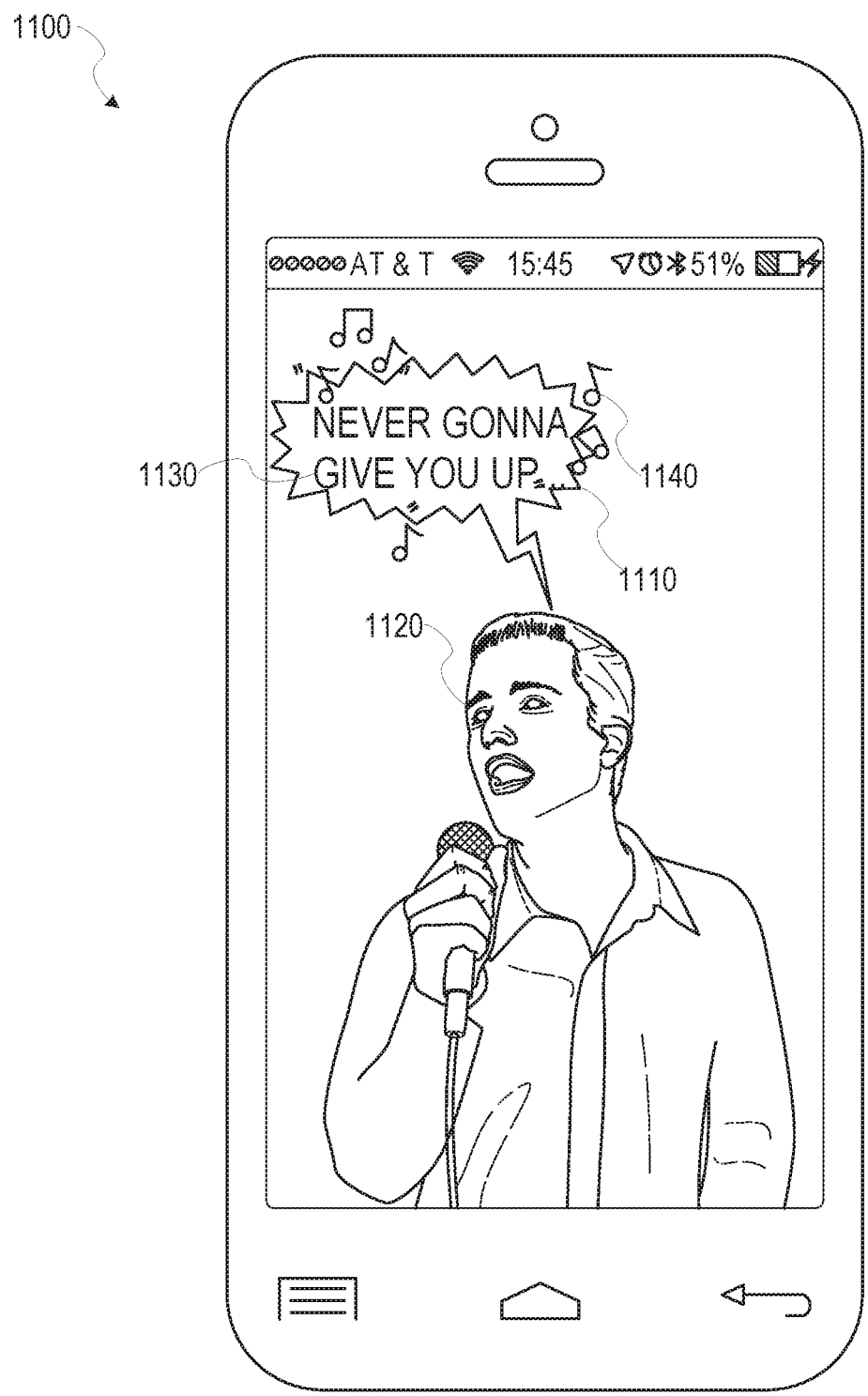
FIG. 11 is an example of an augmented reality speech bubble, according to certain example embodiments.

FIG. 11 is an example of an augmented reality interface 1100 configured to display an augmented reality speech bubble 1110, according to certain example embodiments. FIG. 11 includes a speech bubble 1110, an individual 1120, a text string 1130, and graphical elements 1140.

As discussed above, with respect to FIG. 8, the augmented reality system 150 may determine an emotional effect of the detected speech. In some example embodiments, the augmented reality system 150 may determine that the speech includes musical elements, indicating that the speech is singing, or a song. For example, the augmented reality system 150 may compare the detected speech to a musical library to determine if the speech matches an existing song. In response to a determination that the speech includes musical elements, the augmented reality system 150 may cause display of a graphical element to indicate that the speech has musical elements (e.g., graphical elements 1140 includes musical notes).

In some example embodiments as discussed above, the augmented reality system 150 generates the speech bubble 1110 based on speech properties and the emotional effect.

Figure 12:
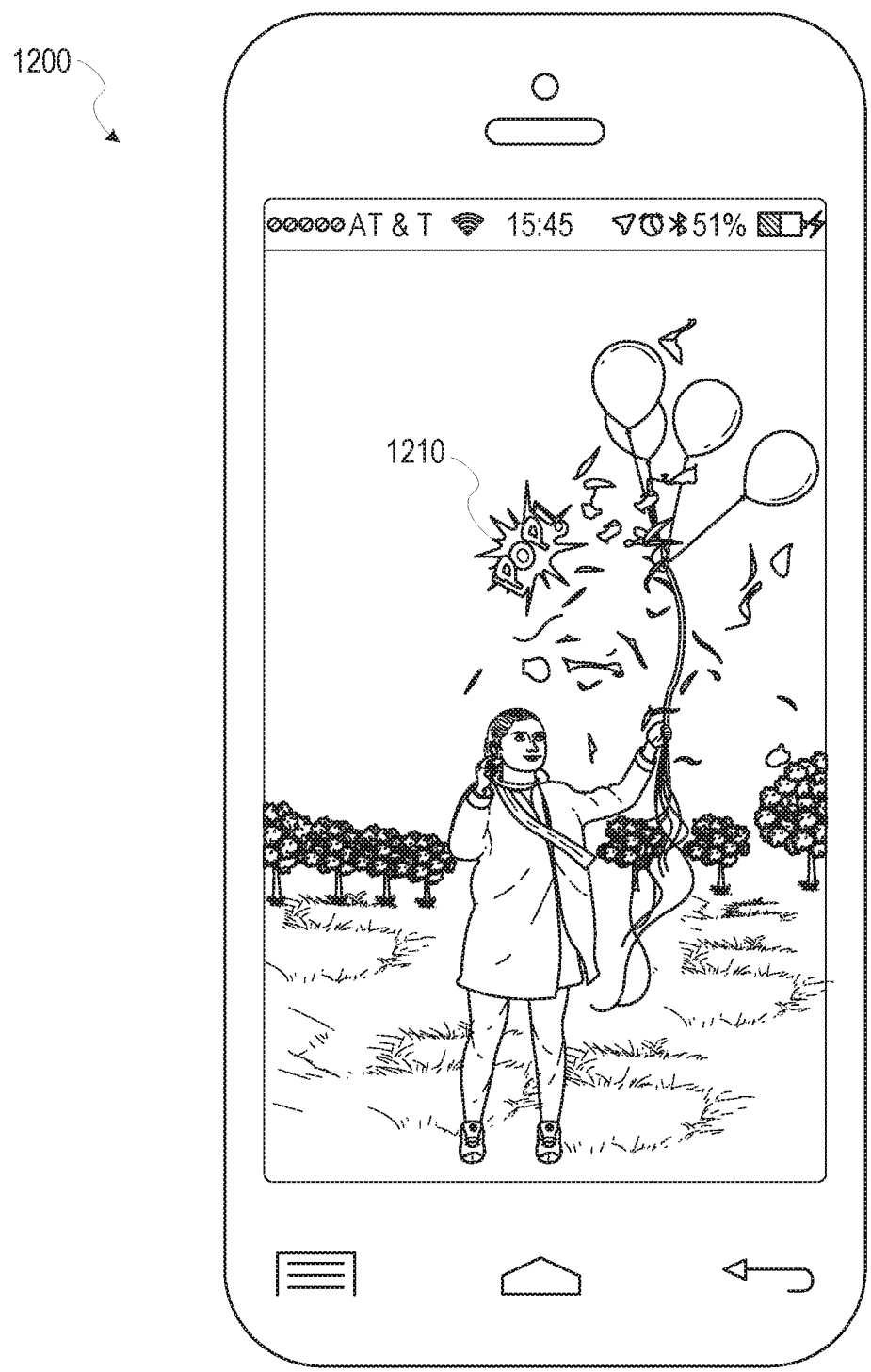
FIG. 12 is an example of an augmented reality speech bubble, according to certain example embodiments.

FIG. 12 is an example of an augmented reality interface 1200 configured to display augmented reality onomatopoeia 1210 as discussed in FIG. 9, according to certain example embodiments.

As discussed in FIG. 9, the augmented reality system 150 may detect a non-verbal sound, and compare the non-verbal sound to an onomatopoeia library. Upon comparing the non-verbal sound to the onomatopoeia library, the augmented reality system 150 may select an appropriate graphical element representative of the onomatopoeia to display in the augmented reality interface 1200.

In some example embodiments, the augmented reality system 150 may detect a source of the non-verbal sound based on image and video data, and/or based on audio location techniques. Audio location include techniques for performing accurate three-dimensional location sensing using audio hardware of a mobile device (e.g., client device 102). In such embodiments, the time-of-flight of a sound is used to determine the accurate location of a source of the sound.

As depicted in FIG. 12, the augmented reality system 150 detects a non-verbal sound and identifies a location of a source of the non-verbal sound based on image and/or audio location techniques. For example, the augmented reality system 150 may detect a change in the image data that corresponds in time to the detection of the non-verbal sound. Based on the change in the image data occurring simultaneously, or near simultaneously, to the detection of the non-verbal sound, the augmented reality system 150 may determine a location of the sound.

Figure 13:
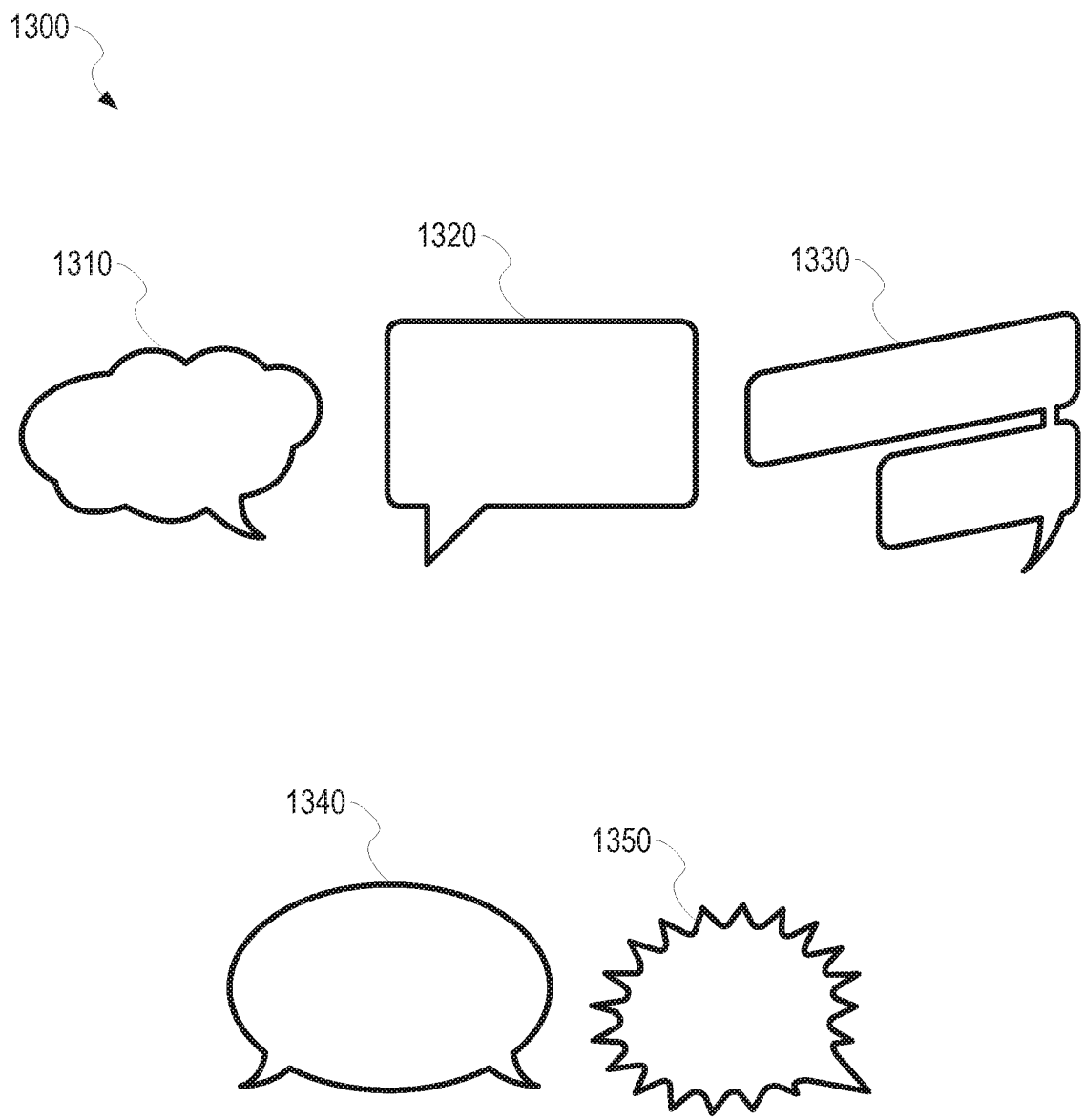
FIG. 13 is a diagram illustrating various augmented reality speech bubbles, according to certain example embodiments.

FIG. 13 is a diagram illustrating various augmented reality speech bubbles 1300, according to certain example embodiments. FIG. 13 includes speech bubbles 1310, 1320, 1330, 1340, and 1350.

As discussed in operation 804 of FIG. 8, the augmented reality system 150 may select a speech bubble from a speech bubble library based on an emotional effect of the detected speech and the speech properties.

Software Architecture

Figure 14:
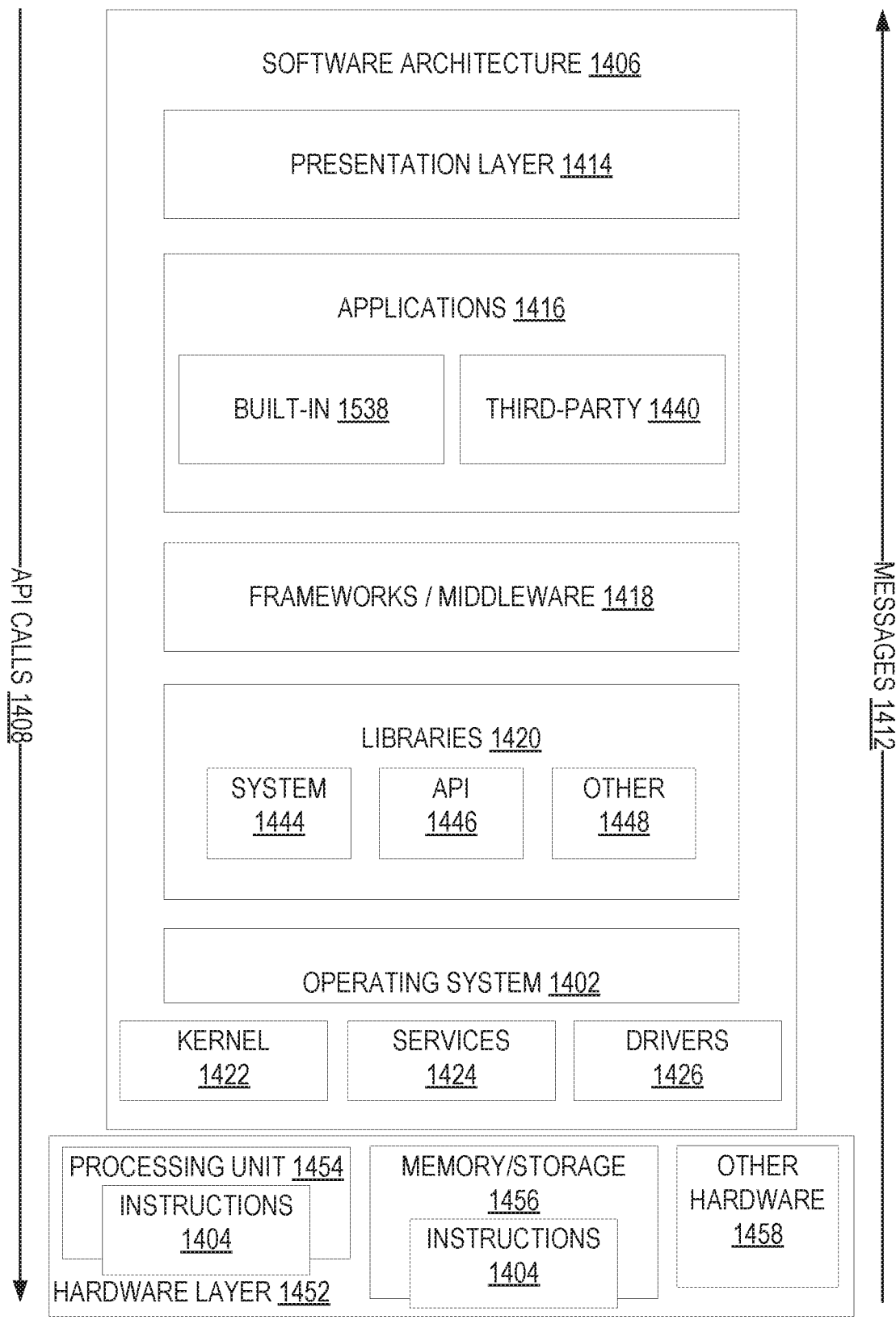
FIG. 14 is a block diagram illustrating a representative software architecture, which may be used in conjunction with various hardware architectures herein described and used to implement various embodiments.

FIG. 14 is a block diagram illustrating an example software architecture 1406, which may be used in conjunction with various hardware architectures herein described. FIG. 14 is a non-limiting example of a software architecture and it will be appreciated that many other architectures may be implemented to facilitate the functionality described herein. The software architecture 1406 may execute on hardware such as machine 1300 of FIG. 13 that includes, among other things, processors 1304, memory 1314, and I/O components 1318. A representative hardware layer 1452 is illustrated and can represent, for example, the machine 1400 of FIG. 14. The representative hardware layer 1452 includes a processing unit 1454 having associated executable instructions 1404. Executable instructions 1404 represent the executable instructions of the software architecture 1406, including implementation of the methods, components and so forth described herein. The hardware layer 1452 also includes memory and/or storage modules memory/storage 1456, which also have executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, applications 1416 and a presentation layer 1414. Operationally, the applications 1416 and/or other components within the layers may invoke application programming interface (API) API calls 1408 through the software stack and receive a response as in response to the API calls 1408. The layers illustrated are representative in nature and not all software architectures have all layers. For example, some mobile or special purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424 and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than to interface directly with the underlying operating system 1402 functionality (e.g., kernel 1422, services 1424 and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media format such as MPREG4. H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 (also sometimes referred to as middleware) provide a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. Third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as operating system 1402) to facilitate functionality described herein.

The applications 1416 may use built in operating system functions (e.g., kernel 1422, services 1424 and/or drivers 1426), libraries 1420, and frameworks/middleware 1418 to create user interfaces to interact with users of the system. Alternatively, or additionally, in some systems interactions with a user may occur through a presentation layer, such as presentation layer 1414. In these systems, the application/component "logic" can be separated from the aspects of the application/component that interact with a user.

Figure 15:
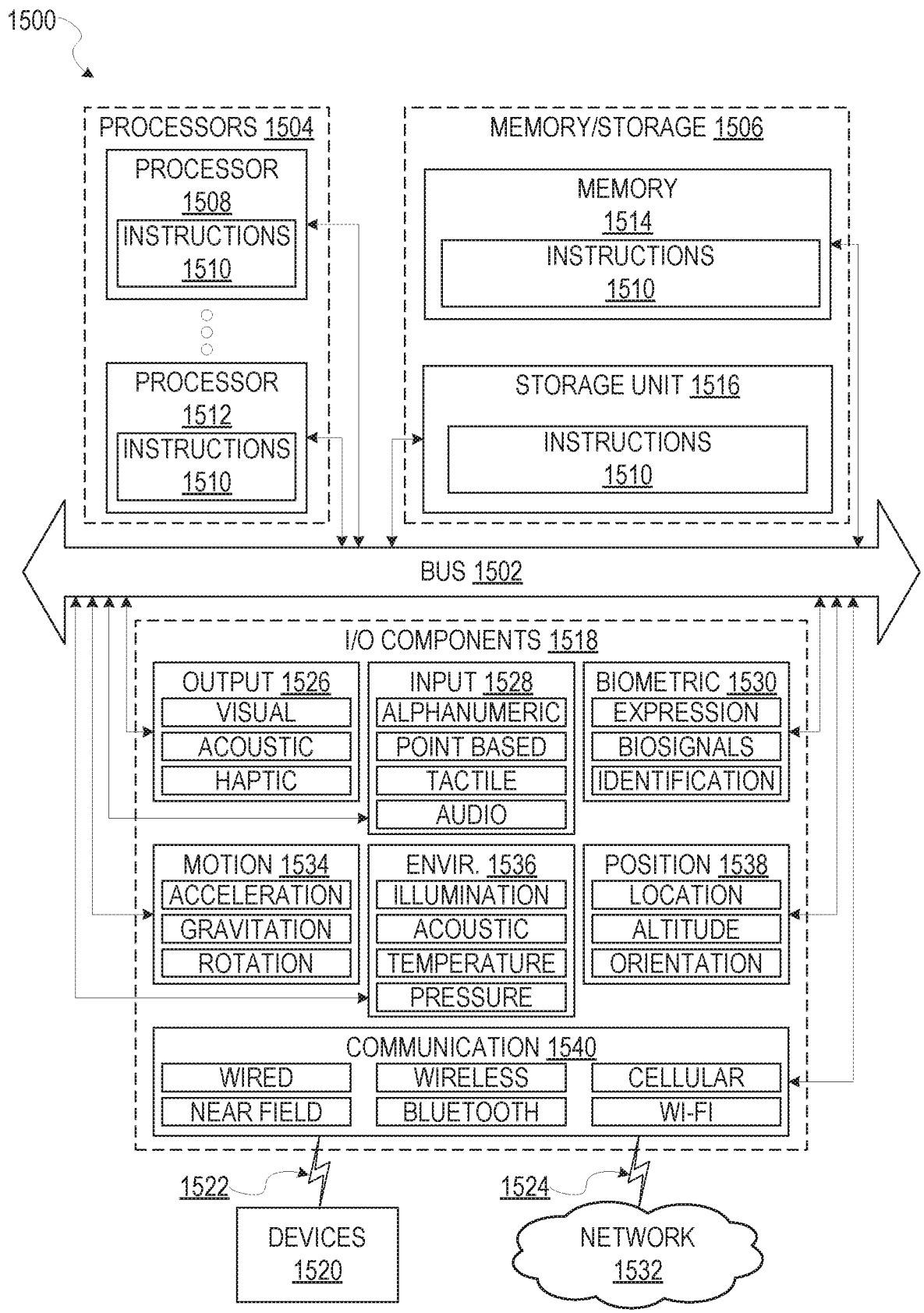
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory memory/storage 1506, and I/O components 1518, which may be configured to communicate with each other such as via a bus 1502. The memory/storage 1506 may include a memory 1514, such as a main memory, or other memory storage, and a storage unit 1516, both accessible to the processors 1504 such as via the bus 1502. The storage unit 1516 and memory 1514 store the instructions 1510 embodying any one or more of the methodologies or functions described herein. The instructions 1510 may also reside, completely or partially, within the memory 1514, within the storage unit 1516, within at least one of the processors 1504 (e.g., within the processor's cache memory), or any suitable combination thereof, during execution thereof by the machine 1500. Accordingly, the memory 1514, the storage unit 1516, and the memory of processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion and the grouping is in no way limiting. In various example embodiments, the I/O components 1518 may include output components 1526 and input components 1528. The output components 1526 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1518 may include biometric components 1530, motion components 1534, environmental environment components 1536, or position components 1538 among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1538 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via coupling 1522 and coupling 1524 respectively. For example, the communication components 1540 may include a network interface component or other suitable device to interface with the network 1532. In further examples, communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a Universal Serial Bus (USB)).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1540, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:
1. A system comprising:
a memory; and
at least one hardware processor coupled to the memory and comprising instructions that causes the system to perform operations comprising:
causing display at a client device, of a presentation of a space, the presentation of the space including at least a first person;
detecting, by the client device, speech that comprises speech properties, the speech properties including a volume of the speech;
identifying the first person as a source of the speech;
identifying a first language in response to the detecting the speech;
translating the speech from the first language to a second language in response to the identifying the first language;
selecting a speech bubble from a speech bubble library based on the volume of the speech, the speech bubble library comprising a plurality of speech bubbles; and causing display of the speech bubble at a position proximate to the first person within the presentation of the space, the speech bubble containing a display of the translated text string.

2. The system of claim 1, wherein the selecting the speech bubble from the speech bubble library based on the speech properties further comprises:
transcribing the speech to a text string;
parsing the text string to a set of words;
determining a definition of each word among the set of words;
performing a comparison of the definition of each word to an emotional effect library;
determining an emotional effect of the speech based on the comparison; and
selecting the speech bubble based on the emotional effect.

3. The system of claim 2, wherein the first person has a set of facial landmarks, and wherein the determining the emotional effect of the speech further comprises:
capturing an image of the first person in response to identifying the first person as the source of the speech;
extracting the set of facial landmarks from the image of the first person; and
determining the emotional effect based on the set of facial landmarks and the comparison.

4. The system of claim 1, wherein the speech properties include at least a volume, and wherein the selecting the speech bubble from the speech bubble library includes:
determining a property of the volume of the speech based on the speech properties; and
selecting the speech bubble based on the property of the volume.

5. The system of claim 1, wherein the instructions cause the system to perform operations further comprising:
detecting a non-verbal sound;
comparing the non-verbal sound to an onomatopoeia library in response to the detecting the non-verbal sound;
identifying an onomatopoeia from the onomatopoeia library based on the non-verbal sound; and
causing display of a graphical element based on the onomatopoeia within the presentation of the space.

6. The system of claim 1, wherein the instructions cause the system to perform operations further comprising:
detecting movement of a mouth of the first person; and
identifying the first person as the source of the speech based on the movement of the mouth.

7. The system of claim 1, wherein the translating the speech from the first language to the second language includes:
accessing a user profile associated with the client device in response to the identifying the first language based on the speech, wherein the user profile includes a language preference, the language preference specifying the second language.

8. A method comprising:
causing display at a client device, of a presentation of a space, the presentation of the space including at least a first person;
detecting, by the client device, speech that comprises speech properties, the speech properties including a volume of the speech;
identifying the first person as a source of the speech;
identifying a first language in response to the detecting the speech;
translating the speech from the first language to a second language in response to the identifying the first language;
selecting a speech bubble from a speech bubble library based on the volume of the speech, the speech bubble library comprising a plurality of speech bubbles; and
causing display of the speech bubble at a position proximate to the first person within the presentation of the space, the speech bubble containing a display of the translated text string.

9. The method of claim 8, wherein the selecting the speech bubble from the speech bubble library based on the speech properties further comprises:
transcribing the speech to a text string;
parsing the text string to a set of words;
determining a definition of each word among the set of words;
performing a comparison of the definition of each word to an emotional effect library;
determining an emotional effect of the speech based on the comparison; and
selecting the speech bubble based on the emotional effect.

10. The method of claim 9, wherein the first person has a set of facial landmarks, and wherein the determining the emotional effect of the speech further comprises:
capturing an image of the first person in response to identifying the first person as the source of the speech;
extracting the set of facial landmarks from the image of the first person; and
determining the emotional effect based on the set of facial landmarks and the comparison.

11. The method of claim 8, wherein the speech properties include at least a volume, and wherein the selecting the speech bubble from the speech bubble library includes:
determining a property of the volume of the speech based on the speech properties; and
selecting the speech bubble based on the property of the volume.

12. The method of claim 8, wherein the instructions cause the system to perform operations further comprising:
detecting a non-verbal sound;
comparing the non-verbal sound to an onomatopoeia library in response to the detecting the non-verbal sound;
identifying an onomatopoeia from the onomatopoeia library based on the non-verbal sound; and
causing display of a graphical element based on the onomatopoeia within the presentation of the space.

13. The method of claim 8, wherein the method further comprises:
detecting movement of a mouth of the first person; and
identifying the first person as the source of the speech based on the movement of the mouth.

14. The method of claim 8, wherein the translating the speech from the first language to the second language includes:
accessing a user profile associated with the client device in response to the identifying the first language based on the speech, wherein the user profile includes a language preference, the language preference specifying the second language.

15. A non-transitory machine-readable storage medium comprising instructions that, when executed by one or more processors of a machine, cause the machine to perform operations including:

causing display at a client device, of a presentation of a space, the presentation of the space including at least a first person;

detecting, by the client device, speech that comprises speech properties, the speech properties including a volume of the speech;

identifying the first person as a source of the speech;

identifying a first language in response to the detecting the speech;

translating the speech from the first language to a second language in response to the identifying the first language, selecting a speech bubble from a speech bubble library based on the volume of the speech, the speech bubble library comprising a plurality of speech bubbles; and causing display of the speech bubble at a position proximate to the first person within the presentation of the space, the speech bubble containing a display of the translated text string.

16. The non-transitory machine-readable storage medium of claim 15, wherein the selecting the speech bubble from the speech bubble library based on the speech properties includes:

transcribing the speech to a text string;
parsing the text string to a set of words;
determining a definition of each word among the set of words;
performing a comparison of the definition of each word to an emotional effect library;
determining an emotional effect of the speech based on the comparison; and
selecting the speech bubble based on the emotional effect.

17. The non-transitory machine-readable storage medium of claim 15, wherein the first person has a set of facial landmarks, and wherein the determining the emotional effect of the speech includes:

capturing an image of the first person in response to identifying the first person as the source of the speech;
extracting the set of facial landmarks from the image of the first person; and
determining the emotional effect based on the set of facial landmarks and the comparison.

18. The non-transitory machine-readable storage medium of claim 15, wherein the speech properties include at least a volume, and wherein the selecting the speech bubble from the speech bubble library includes:

determining a property of the volume of the speech based on the speech properties; and
selecting the speech bubble based on the property of the volume.

19. The non-transitory machine-readable storage medium of claim 15, wherein the instructions cause the system to perform operations further comprising:

detecting a non-verbal sound;
comparing the non-verbal sound to an onomatopoeia library in response to the detecting the non-verbal sound;
identifying an onomatopoeia from the onomatopoeia library based on the non-verbal sound; and
causing display of a graphical element based on the onomatopoeia within the presentation of the space.

20. The non-transitory machine-readable storage medium of claim 15, wherein the instructions cause the machine to perform operations further comprising:

detecting movement of a mouth of the first person; and
identifying the first person as the source of the speech based on the movement of the mouth.

* * * * *

UNITED STATES PATENT AND TRADEMARK OFFICE
CERTIFICATE OF CORRECTION

PATENT NO. : 10,614,828 B1  
APPLICATION NO. : 16/014193  
DATED : April 7, 2020  
INVENTOR(S) : Cowburn et al.

Page 1 of 1

It is certified that error appears in the above-identified patent and that said Letters Patent is hereby corrected as shown below:

In the Claims

In Column 29, Lines 11-12, in Claim 15, delete "language," and insert --language;-- therefor Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*